US012042792B2

(12) United States Patent
Han et al.

(10) Patent No.: US 12,042,792 B2
(45) Date of Patent: Jul. 23, 2024

(54) MULTI-DIMENSIONAL DOUBLE SPIRAL DEVICE AND METHODS OF USE THEREOF

(71) Applicant: Massachusetts Institute of Technology, Cambridge, MA (US)

(72) Inventors: Jongyoon Han, Bedford, MA (US); Hyungkook Jeon, Cambridge, MA (US)

(73) Assignee: MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 909 days.

(21) Appl. No.: 16/683,917

(22) Filed: Nov. 14, 2019

(65) Prior Publication Data

US 2020/0171488 A1 Jun. 4, 2020

Related U.S. Application Data

(60) Provisional application No. 62/767,729, filed on Nov. 15, 2018.

(51) Int. Cl.
*B01L 3/00* (2006.01)

(52) U.S. Cl.
CPC ..... *B01L 3/5027* (2013.01); *B01L 2200/0652* (2013.01); *B01L 2300/0809* (2013.01);
(Continued)

(58) Field of Classification Search
CPC ....... B01L 3/502761; B01L 2200/0652; B01L 2300/0864; B01L 2300/088;
(Continued)

(56) References Cited

U.S. PATENT DOCUMENTS 8,931,644 B2 1/2015 Lean et al.
9,433,880 B2 9/2016 Lean et al.
(Continued)

FOREIGN PATENT DOCUMENTS

CN 108132208 A 6/2018
EP 1942329 A2 7/2008
(Continued)

OTHER PUBLICATIONS

Bhagat, A. A. S., Kuntaegowdanahalli, S. S. & Papautsky, I. Continuous particle separation in spiral microchannels using dean flows and differential migration. Lab Chip 8, 1906 (2008).
(Continued)

*Primary Examiner* — Dean Kwak
(74) *Attorney, Agent, or Firm* — PABST PATENT GROUP LLP

(57) ABSTRACT

Described is a multi-dimensional double spiral (MDDS) microfluidic device comprising a first spiral microchannel and a second microchannel, wherein the wherein the first spiral microchannel and second spiral microchannel have different cross-sectional areas. Also described is a device comprising a multi-dimensional double spiral and system for recirculation. The invention also encompasses methods of separating particles from a sample fluid comprising a mixture of particles comprising the use of the multi-dimensional double spiral microfluidic device.

30 Claims, 13 Drawing Sheets

(52) U.S. Cl.
CPC .................. *B01L 2300/0864* (2013.01); *B01L 2300/0883* (2013.01); *B01L 2400/0487* (2013.01)

(58) Field of Classification Search
CPC ..... B01L 2300/0816; B01L 2400/0487; B01L 3/502753; B01L 2300/0883; B01L 2300/0861; B01L 2200/0647; B01L 2300/0858; B01L 2300/0809; B01L 2400/086; B01L 3/5027; G01N 2015/1006; G01N 2015/149; G01N 15/1404; G01N 15/1484; G01N 1/4077; G01N 2001/4088; G01N 2015/0288; G01N 2015/1081; G01N 2015/1087; G01N 2015/1415; G01N 2015/1486
See application file for complete search history.

(56) References Cited

U.S. PATENT DOCUMENTS

| | | | | |
|---|---|---|---|---|
| 9,486,812 | B2 | 11/2016 | Lean et al. | |
| 9,862,624 | B2 | 1/2018 | Lean et al. | |
| 10,052,571 | B2 | 8/2018 | Lean et al. | |
| 2004/0256318 | A1* | 12/2004 | Iida | B01D 61/28 210/511 |
| 2008/0128331 | A1 | 6/2008 | Lean et al. | |
| 2009/0114601 | A1 | 5/2009 | Lean et al. | |
| 2009/0114607 | A1 | 5/2009 | Lean et al. | |
| 2009/0283452 | A1 | 11/2009 | Lean et al. | |
| 2009/0283455 | A1 | 11/2009 | Lean et al. | |
| 2010/0072142 | A1 | 3/2010 | Lean et al. | |
| 2010/0314323 | A1 | 12/2010 | Lean et al. | |
| 2010/0314325 | A1 | 12/2010 | Lean et al. | |
| 2010/0314327 | A1 | 12/2010 | Lean et al. | |
| 2010/0323388 | A1* | 12/2010 | Chiu | B01D 67/0062 435/325 |
| 2011/0108491 | A1 | 5/2011 | Lean et al. | |
| 2012/0152855 | A1 | 6/2012 | Lean et al. | |
| 2012/0193297 | A1 | 8/2012 | Lean et al. | |
| 2012/0193298 | A1 | 8/2012 | Lean et al. | |
| 2013/0130226 | A1 | 5/2013 | Lim et al. | |
| 2015/0238963 | A1 | 8/2015 | Han et al. | |
| 2016/0123858 | A1 | 5/2016 | Kapur | |
| 2016/0331297 | A1 | 11/2016 | Voldman et al. | |
| 2017/0113222 | A1 | 4/2017 | Grummitt | |
| 2017/0234799 | A1* | 8/2017 | Marks | G01N 33/54346 356/301 |
| 2017/0307488 | A1 | 10/2017 | Sarkar et al. | |
| 2018/0128723 | A1 | 5/2018 | Ryu et al. | |
| 2018/0136210 | A1 | 5/2018 | Khoo et al. | |

FOREIGN PATENT DOCUMENTS

| | | | |
|---|---|---|---|
| EP | 2060312 | A2 | 5/2009 |
| WO | 2011109762 | A1 | 9/2011 |
| WO | 2013181615 | A1 | 12/2013 |
| WO | 2014046621 | A1 | 3/2014 |
| WO | 2014152643 | A2 | 9/2014 |
| WO | 2015156876 | A2 | 10/2015 |
| WO | 2016044537 | A1 | 3/2016 |
| WO | 2016044555 | A1 | 3/2016 |
| WO | 2016077055 | A1 | 5/2016 |
| WO | 2018009756 | A1 | 1/2018 |

OTHER PUBLICATIONS

Choi, K. et al. Negative Selection by Spiral Inertial Microfluidics Improves Viral Recovery and Sequencing from Blood. Anal. Chem. 90, 4657-4662 (2018).
Dicarlo, D. Inertial microfluidics. Lab Chip 9, 3038 (2009).
Guan, G. et al. Spiral microchannel with rectangular and trapezoidal cross-sections for size based particle separation. Sci. Rep. 3, 1-9 (2013).
Hou, H. W., Bhattacharyya, R. P., Hung, D. T. & Han, J. Direct detection and drug resistance profiling of bacteremias using inertial microfluidics. Lab Chip 15, 2297-2307 (2015).
Hou, H. W. et al. Isolation and retrieval of circulating tumor cells using centrifugal forces, Sci. Rep. 3, 1-8 (2013).
Howell, P. B., Mott, D. R., Golden, J. P. & Ligler, F. S. Design and evaluation of a Dean vortex-based micromixer. Lab Chip 4, 663-669 (2004).
Huang, D. et al. Rapid separation of human breast cancer cells from blood using a simple spiral channel device. Anal. Methods 8, 5940-5948 (2016).
Kuntaegowdananhalli, S. S., Bhagat, A. A. S., Kumar, G. & Papautsky, I. Inertial microfluidics for continuous particle separation in spiral microchannels. Lab Chip 9, 2973 (2009).
Kwon, T. et al. Microfluidic Cell Retention Device for Perfusion of Mammalian Suspension Culture. Sci. Rep. 7, 1-11 (2017).
Martel, J. M. & Toner, M. Inertial Focusing in Microfluidics. Annu. Rev. Biomed. Eng. 16, 371-396 (2014).
Rafeie, M., Zhang, J., Asadnia, M., Li, W. & Warkiani, M. E. Multiplexing slanted spiral microchannels for ultra-fast blood plasma separation. Lab Chip 16, 2791-2802 (2016).
Russom, A. et al. Differential inertial focusing of particles in curved low-aspect-ratio microchannels. New J. Phys. 11, (2009).
Ryu, H. et al. Patient-Derived Airway Secretion Dissociation Technique to Isolate and Concentrate Immune Cells Using Closed-Loop Inertial Microfluidics. Anal. Chem. 89, 5549-5556 (2017).
Sarkar, A., Hou, H. W., Mahan, A. E., Han, J. & Alter, G. Multiplexed Affinity-Based Separation of Proteins and Cells Using Inertial Microfluidics. Sci. Rep. 6, 1-9 (2016).
Seo, J., Lean, M. H. & Kole, A. Membrane-free microfiltration by asymmetric inertial migration. Appl. Phys. Lett. 91, (2007).
Sudarsan, A. P. & Ugaz, V. M. Multivortex micromixing. Proc. Natl. Acad. Sci. 103, 7228-7233 (2006).
Sudersan, A. P. & Ugaz, V. M. Fluid mixing in planar spiral microchannels. Lab Chip 6, 74-82 (2006).
Sun, J. et al. Double spiral microchannel for label-free tumor cell separation and enrichment. Lab Chip 12, 3952 (2012).
Sun, J. et al. Size-based hydrodynamic rare tumor cell separation in curved microfluidic channels. Biomicrofluidics 7, (2013).
Wang, J. et al. Label-Free Isolation and mRNA Detection of Circulating Tumor Cells from Patients with Metastatic Lung Cancer for Disease Diagnosis and Monitoring Therapeutic Efficacy. Anal. Chem. 87, 11893-11900 (2015).
Warkiani, M. E. et al. An ultra-high-throughput spiral microfluidic biochip for the enrichment of circulating tumor cells. Analyst 139, 3245-3255 (2014).
Warkiani, M. E., Tay, A. K. P., Guan, G. & Han, J. Membrane-less microfiltration using inertial microfluidics. Sci. Rep. 5, 11018 (2015).
Woodside, S., "Mammalian Cell Retention Devices for Stirred Perfusion Bioreactors," Cytotechnology, vol. 28, pp. 163-175 (1998).
Wu, L., Guan, G., Hou, H. W., Bhagat, A. A. S. & Han, J. Separation of leukocytes from blood using spiral channel with trapezoid cross-section. Anal. Chem. 84, 9324-9331 (2012).
Xiang, N. et al. Inertial microfluidic syringe cell concentrator. Anal. Chem. acs.analchem.8b02201 (2018). doi:10.1021/acs.analchem.8b02201.
Xiang, N. et al. Improved understanding of particle migration modes in spiral inertial microfluidic devices. RSC Adv. 5, 77264-77273 (2015).
Zhou, J., Giridhar, P. V., Kasper, S. & Papautsky, I. Modulation of aspect ratio for complete separation in an inertial microfluidic channel. Lab Chip 13, 1919 (2013).
Alfayez, F., et al., "Development of a Stand-Alone Microfluidic Device," Dept. of Mechanical Engineering, Worcester Polytechnic Institute, Worcester, MA., pp. 1-47.
Al Amin, A., et al., High Throughput Particle Separation Using Differential Fermat Spiral Microchannel with Variable Channel Width, Thesis, The University of Akron, Dec. 2014.
Bhagat, A., et al., "Dean Flow Fractionation (DFF) Isolation of Circulating Tumor Cells (CTCs) from Blood," 15th International Conference on Miniaturized Systems for Chemistry and Life Sciences, Oct. 2011.

(56) References Cited

OTHER PUBLICATIONS

Robinson, M., et al., "Rapid Isolation of Blood Plasma Using a Cascaded Inertial Microfluidic Device," Biomicrofludics, vol. 11 (2017).

* cited by examiner (a) Single Spiral Device (Outlet Region)

Red: 10 μm particle
Green: 6 μm particle (b) MDDS Device

- Transition Region - - Outlet Region -

MULTI-DIMENSIONAL DOUBLE SPIRAL DEVICE AND METHODS OF USE THEREOF

RELATED APPLICATION

This application claims the benefit of U.S. Provisional Application No. 62/767,729 filed Nov. 15, 2018. The entire teachings of the above-referenced application are incorporated herein by reference.

GOVERNMENT SUPPORT

This invention was made with Government support under Grants No. R01 AI117043 and U24 AI118656 awarded by the National Institutes of Health. The Government has certain rights in this invention.

BACKGROUND OF THE INVENTION

As the most general method on the macroscale, centrifugation has been widely used for sample preparation in the laboratory; especially, a density matrix is usually employed for the target particles to selectively move through for cleaner separation, which is known as density gradient centrifugation.[1B,5B,7B] Although the technique itself is simple and straightforward, it is labor-, energy- and time-intensive and requires well-trained operators as its limitations.[5B] As other drawbacks, due to its inherent characteristics, it is hard to obtain reliable separation performance including target recovery, purity, and concentration which are also affected by operating personnel, and generally large volume of sample (order of 1 mL) is required for proper output acquisition. As other conventional methods, fluorescence activated cell sorting (FACS), magnetic activated cell sorting (MACS) have been used to precisely control and separate target cells.[5B,6B,8B] While those methods offer an effective high-throughput and high-resolution separation, a time and effort consuming process is required for labelling cells, and the labelling process can lead to changes in the intrinsic cell properties and irreversible cell damage.[7B]

To overcome the limitations of conventional macroscale separation methods, a number of microfluidic separation techniques have been developed with many advantages of precise target control, minimized sample and reagent requirement, and capability of integration with different functional devices without the labelling process.[1-4B,9B,10B] Among those techniques, spiral microfluidic devices have been extensively utilized in sample preparation due to their inherent advantages including high throughput (order of 1 mL/min per a single device), simple and robust operation without any need of additional force fields like magnetic, electric, and acoustic fields, and spatially compact device configuration compared to other inertial microfluidic devices.[7B,11-36B]

In spiral microfluidic devices, lateral particle motion (in the cross-sectional view) is affected by inertial focusing by lift forces and circulating motion by additional hydrodynamic drag force caused by Dean flow.[1A,2A] When a fluid flows through a curved channel, fluid elements near the channel centerline have a higher flow rate as compared to the fluid near the channel wall, and move outwards to the outer channel wall due to centrifugal effects and pressure gradient caused by the longer travel length along the outer wall compared to the inner wall, resulting in a secondary flow, the Dean flow.[1A,2A,13A,21A] Depending on the size of the particle, the magnitude of the applied net lift force and the Dean drag force are changed, determining whether particles keep moving along the Dean flow or become focused on a certain equilibrium location in the channel's cross-sectional view.

The confinement ratio ($CR=a/D_h$, where a is the particle diameter and $D_h$ is the hydraulic diameter of microchannel), is the key parameter with respect to the particle motion.[1A,22A-25A] Generally (for moderate flow rate condition with a constraint of the Dean number, $De=R_c(D_h/2r)^{1/2}<75$, where $\delta=D_h/2r$ and r represent the curvature ratio and the average radius of curvature of the channel, respectively),[28] in the case of a small CR (<0.07), the net lift force applied to particles is negligible compared to Dean drag force, resulting in the circulating motion of particles without focusing (the non-focusing mode).[24A,25A] In the case of large CR(≥0.07), the lift force becomes stronger and comparable with Dean drag force, resulting in particle focusing on an equilibrium location determined by the competition between the net lift force and the Dean drag force (the focusing mode). In the intermediate CR ($0.01 \leq CR < 0.07$), particle motion is described as the rough focusing mode. As particle size increases, both the lift force and Dean drag force increase, but with a different power; in the case of the inertial lift force ($F_L$), $F_D \propto a^4$, and in case of the Dean drag force ($F_D$), $F_D \propto a$. Therefore, generally in the spiral device, as particle size increases, the equilibrium location gradually moves toward the inner wall due to the highly increased lift force, and, using this principle, particles can be separated depending on their sizes.[3A-16A,21A,22A,26A,27A]

Spiral microfluidic devices have been widely utilized for the separation of particles, especially for large CR particles,[13A,14A,16A] but there are some critical drawbacks which reduce their applicability. These drawbacks include narrow target size ranges (due to the difficulty in focusing particles with the small and intermediate CR conditions) and the relatively low-efficiency and somewhat unreliable separation (due to the small separation distance between focused bands of large CR particles which exist only around the inner wall side). For effective separation in such spiral devices, various approaches have been studied; including, for example, use of a two-inlets spiral device with an additional sheath flow,[4A,8A,11A,12A] a trapezoidal spiral device,[3,9,10,22] and a double-spiral device.[5A-7A,17A]

With respect to the spiral device with an additional sheath flow,[4A,8A,11A,12A] all particles (with the large and even intermediate CR conditions) are injected into the spiral channel, are focused on the outer wall side by the additional sheath flow, and start moving away from the focused flow stream to their equilibrium locations which results in their separation. The initial focusing effectively reduces the particle interaction while the particles travel to their equilibrium locations, which significantly increases separation resolution and efficiency. In addition, due to the initial focusing on the outer wall side, particles in the intermediate CR range can reach their equilibrium locations near the outer wall in a focused band, despite low applied lift force. As a result, in the spiral device with an additional sheath flow, particles can be separated with high separation performance and wide target size ranges (even particles in the intermediate CR range). In the case of separating two different sizes of particles, design channel dimensions can be designed or configured so as to have different CR regimes so that the large CR particles and the intermediate CR particles can be focused near the inner wall and the outer wall, respectively, resulting in their separation with large separation distance and high separation efficiency.

However, the use of two inlets makes the flow control complex and limits the operating flexibility such as closed-loop operation,[3A,7A] which reduces the applicability of such devices. Recently, a novel spiral microfluidic device with a trapezoidal cross-section was described which generates stronger Dean vortices at the outer half of the channel, resulting in significantly increased separation distance between larger and smaller particles even in a one-inlet configuration.[3A,9A,10A,13A,22A] However, even in the trapezoidal spiral device, because of the low magnitude of lift force driving particle focusing, small particles with the intermediate CR may still not form a focused band, and this in turn limits the applicability of the trapezoidal spiral device. In the double spiral device,[5A-7A,17A] the sequential pinch effect acts to compact both sides of the focusing band resulting in a sharper and narrower band compared to single spiral device, which improves separation performance. However, the double spiral device also has the difficulty in focusing and separating particles within the intermediate CR range, and the separation performance is less than that of the two-inlet spiral device with an additional sheath flow.

Therefore, although significant progress has been made with respect to spiral microfluidic devices, drawbacks still exist; such as requiring precise flow control (in case of 2-inlets system) and low separation performance for particles with the intermediate CR condition. There remains a need in the art for a microfluidic device and method of use, wherein the separation can be achieved with higher reliability and simpler operation, and/or separation of target samples having various size ranges can be achieved, including not only particles in the large CR range but also particles in the intermediate CR range.

Also, to extend applicability of the spiral microfluidic devices from “laboratory research level” to “real clinical application level”, a fully automated and portable operating platform is desirable, and it would be advantageous for such a platform to be operated without any large imaging instrument like a microscope for high accessibility.

SUMMARY OF THE INVENTION

The present invention is directed to a microfluidic device comprising a multi-dimensional double spiral (MDDS) and a device comprising a fully automated recirculation platform and the MDDS. The MDDS comprises a first spiral microchannel and a second microchannel, wherein the first spiral microchannel and second spiral microchannel have different cross-sectional areas. The first spiral microchannel and the second spiral microchannel of the MDDS are connected sequentially or in series, such that output from the first spiral microchannel is directed into the second spiral microchannel. The invention also encompasses methods of separating particles from a sample fluid comprising a mixture of particles comprising the use of the MDDS device. The invention encompasses MDDS devices and uses thereof wherein the first spiral microchannel is configured to concentrate the particle stream and the second spiral microchannel is configured to separate particles from the concentrated particle stream based on their sizes. The invention also encompasses a recirculation platform based on a check-valve which can regulate the direction of flow, where output can be recirculated in the MDDS device and re-treated several times by fully-automated back-and-forth motions of a syringe pump without any human intervention or even by a hand-powered syringe, resulting in highly purified and concentrated output in a short operation time. The invention additionally encompasses the assembly method of the platform using a connector or support (for example, fabricated by 3D printing method), wherein the MDDS device(s), syringe(s) (used for, example, input and/or output reservoirs), and check-valves can be directly connected for easier device assembly, higher portability, and minimized dead volume.

In certain aspects, the microfluidic device comprises a multidimensional double spiral (MDDS) (also referred to herein as a multi-dimensional double spiral microfluidic device or an MDDS device), wherein the MDDS comprises:

a. a first spiral microchannel comprising a first inlet;

b. a second spiral microchannel in fluid communication with the first spiral microchannel and comprising an inner wall outlet and an outer wall outlet, wherein the inner wall outlet is located on the inner wall side of the microchannel and the outer wall outlet is located on the outer wall side of the microchannel; and c. a transition region, wherein the transition region is a microchannel that joins the first and second spiral microchannels, wherein the output from the first spiral microchannel is directed into the second spiral microchannel in the transition region;

wherein the first spiral microchannel of the device has smaller dimensions, or a smaller cross-sectional area, than the second spiral microchannel, and wherein the MDDS device is configured to separate particles from a sample fluid comprising a mixture of particles. The cross-sectional area of the first spiral microchannel can remain constant along its length (for example, from the inlet to the transition region) and the cross-sectional area of the second spiral microchannel can also remain constant along its length (from the transition region to the outlet). In additional aspects, the first spiral microchannel is configured to concentrate the particles into a concentrated particle stream and the second spiral microchannel is configured to separate particles from the concentrated particle stream based on their sizes. In yet additional embodiments, the first spiral microchannel is configured to form the concentrated particle stream on the inner wall side of the first spiral microchannel and the device is configured to direct the concentrated particle stream to enter the outer wall side of the second spiral microchannel. In further aspects, the second spiral microchannel is configured to direct a first particle stream to the inner wall outlet and to direct a second particle stream to the outer wall outlet, wherein the first particle stream comprises particles having a larger average diameter than that of the particles in the second particle stream. In certain additional aspects, particles having more than two sizes can be separated into each outlet (see, for example, FIG. 1A which shows an inner wall outlet, an outer wall outlet, and three middle outlets between them). Thus, in certain aspects, the second spiral microchannel has one or more middle outlets to which additional streams comprising particles are directed. In certain additional aspects, the device is configured to concentrate and/or separate the particles without additional sheath flow. In further aspects, the first inlet of the first spiral microchannel is the only inlet of the first spiral microchannel.

The invention also encompasses a device comprising the MDDS described herein, wherein the first spiral microchannel of the MDDS device is configured to concentrate the particles into a concentrated particle stream and the second spiral microchannel is configured to separate particles from the concentrated particle stream based on their sizes, and wherein the device further comprises a system for closed loop recirculation; wherein the inner wall outlet of the MDDS is in fluid communication with a first output reservoir and the outer wall outlet is in fluid communication with a second output reservoir, wherein the system for closed loop recirculation recirculates the fluid from the first output reservoir into the inlet of the first microchannel, and comprises a syringe in fluid communication with the first output reservoir and the inlet of the first spiral microchannel; a first check valve positioned between and in fluid communication with the first output reservoir and the syringe; and a second check valve positioned between and in fluid communication with the syringe and the inlet of the first spiral channel. In certain additional aspects, the two check valves can be combined in the form of a dual-check valve.

The invention also encompasses a device comprising the MDDS described herein, wherein the first spiral microchannel of the MDDS device is configured to concentrate the particles into a concentrated particle stream and the second spiral microchannel is configured to separate particles from the concentrated particle stream based on their sizes, and wherein the device further comprises a system for closed loop recirculation; wherein the inner wall outlet of the MDDS is in fluid communication with a first output reservoir and the outer wall outlet is in fluid communication with a second output reservoir, wherein the system for closed loop recirculation recirculates the fluid from the second output reservoir into the inlet of the first microchannel, and comprises a syringe in fluid communication with the second output reservoir and the inlet of the first spiral microchannel; a first check valve positioned between and in fluid communication with the second output reservoir and the syringe; and a second check valve positioned between and in fluid communication with the syringe and the inlet of the first spiral channel. In yet additional aspects, the syringe is part of a syringe pump and/or withdrawal of the fluid from the second output reservoir and infusion into the inlet of the first spiral microchannel by the syringe is automated. In yet other aspects, withdrawal of the fluid from the second output reservoir and injection to the inlet reservoir by the syringe is hand powered. In certain aspects, the device comprises at least two multi-dimensional double spirals (e.g., with combined inlet and outlets for simpler operation), wherein the inlet of each double spiral or the inlet of the double spirals is in fluid communication with the sample fluid and/or the second output reservoir from which fluid is recirculated.

In yet additional aspects, the syringe is part of a syringe pump and/or withdrawal of the fluid from the first output reservoir and infusion into the inlet of the first spiral microchannel by the syringe is automated. In yet other aspects, withdrawal of the fluid from the first output reservoir and infusion into the inlet reservoir by the syringe is hand powered.

In certain additional aspects, the device comprises at least two multi-dimensional double spirals, wherein the first inlet of each double spiral (the inlet of the first spiral microchannel of the MDDS) is in fluid communication with the sample fluid and/or the first output reservoir from which the fluid is recirculated. Where the device comprises at least two multi-dimensional double spirals, the inlet(s) and outlet(s) for the double spiral can be combined or shared for simpler operation. Such devices comprising at least two multi-dimensional double spirals can further comprise a system for closed loop recirculation as described herein.

The present invention also includes a method of separating particles from a sample fluid comprising a mixture of particles, the method comprising the steps of introducing the sample fluid into the inlet of the first spiral microchannel of a device described herein; directing the sample fluid through the first spiral microchannel to the transition region of the device and into and through the second spiral microchannel, and directing a first particle stream to the inner wall outlet and directing a second particle stream to the outer wall outlet, and optionally wherein the first particle stream comprises particles having a larger average diameter than that of the particles in the second particle stream. In additional embodiments, the first spiral microchannel concentrates the particles into a concentrated particle stream and the second spiral microchannel separates particles from the concentrated particle stream based on their sizes. In certain aspects, the method comprises the use of a device comprises a system for closed loop recirculation as described herein. In certain specific aspects, the invention is directed to separating white blood cells from a blood sample comprising the use of a device comprises a system for closed loop recirculation as described herein.

The invention also encompasses a microfluidic device comprising a spiral microchannel wherein the device is configured for closed loop recirculation, and further wherein the device comprises a check valve that permits flow in the direction from an output reservoir to an inlet of the spiral microchannel and blocks flow in the direction from the inlet to the output reservoir.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale emphasis instead being placed upon illustrating the principles of the invention.

FIG. 1A is a schematic showing the channel configuration (the darker shade spiral is the first spiral channel with smaller dimension; and lighter shade spiral is the second spiral channel with larger dimension). FIG. 1B is a schematic drawing showing the operation process at the input of the first spiral channel (having a smaller dimension) where the inner wall is on the left and the outer wall is on the right (1); the output of the first spiral channel shows concentration on the inner wall (left) of the channel (2); the input of the second spiral channel (larger dimension) on the outer wall (right) of the channel (3); and the output of the second spiral channel showing separation of particles based on size with larger particles on the inner wall of the channel (left) and smaller particles on the outer wall of the channel (right).

FIG. 2A shows the 10 μm particles focused on the inner wall (IW). FIG. 2B shows the 10 μm particles exiting the inner wall of the first spiral microchannel (at the transition region) and entering the outer wall side of the second spiral microchannel (left) and a focused stream of 10 μm particles on the inner wall side of the outlet region and the 6 μm particles closer to the outer wall side of the outlet region.

FIG. 3A shows a channel configuration (darker shade spiral: the first spiral channel with smaller dimension, lighter shade spiral: the second spiral channel with larger dimension) and schematic diagram of operation process; the first spiral channel has rectangular cross-section with 800 μm in width and 60 μm in height, and the second spiral channel was designed having larger dimension and trapezoidal cross-section for the effective particle separation with 800 μm in width and 80 and 120 μm in height for the inner wall side and the outer wall side, respectively. FIG. 3B shows particle trajectories in the MDDS device; particles having diameters of 6 and 10 μm were used to mimic the movement of RBCs and WBCs, respectively. In the first spiral channel, both particles are focused into the inner wall side and then go to the outer wall side of the second spiral channel during passage through the S-shaped transition region. In the second spiral channel, due to the increased channel height, only 10 μm particles can be focused into the inner wall side, resulting in the separation from 6 μm particles.

FIGS. 4C and 4D shown RBC and WBC recoveries, respectively, from single spiral and MDDS devices under the optimum flow rate condition, 2.3 mL/min, with various blood dilution conditions.

FIG. 5B is an image of the quad-version of MDDS device. FIG. 5C is a photo of the recirculation platform having two quad-version of MDDS devices. FIGS. 5D and 5E show RBC and WBC recovery rates, respectively, and FIG. 5F shows WBC purity rate for the 3 cycles of recirculation under various flow rate conditions (the optimum flow rate condition is 2.3*8=18.4 mL/min); initial sample: 500× diluted blood.

FIG. 6A is a photo of parallel and fully-automated operation using three different recirculation platforms. FIG. 6B shows RBC and WBC recovery rates and WBC purity after three cycles of recirculation for three different blood samples; the error bars in the graph represent standard deviation of the three different platforms.

FIG. 7B shows RBC and WBC recovery rates and WBC purity rate for the 4 cycles of recirculation under the optimum flow rate condition, 2.3*4=9.2 mL/min. FIG. 7C shows RBC and WBC recovery rates and WBC purity after four cycles of recirculation for three different blood samples.

FIG. 8A shows a schematic diagram of the experimental setup for measuring force applied to the input syringe. FIG. 8B shows force (load) measurement while altering flow rate from 12.0 to 24.0 mL/min. FIG. 8C shows a comparison of applied load and pressure measured by the load cell and the pressure-meter, respectively, depending on various flow rate conditions. FIG. 8D is a photo of hand-powered operation of the recirculation platform with keeping pressure at the optimum pressure value (29.5 psi) for optimum flow rate condition (18.4 mL/min). FIG. 8E shows RBC and WBC recoveries and FIG. 8F shows WBC purity rate for the 3 cycles of recirculation from five different trials of hand-powered operation.

FIG. 9B shows particle trajectories in the single spiral device; particles having diameters of 6 μm and 10 μm were used to mimic the movement of RBCs and WBCs, respectively.

FIGS. 11B and 11C show RBC and WBC recovery rates, respectively, and FIG. 11D shows WBC purity rate for the 3 cycles of recirculation under various flow rate conditions; initial sample: 500× diluted blood. FIG. 11E shows RBC and WBC recovery rates under the optimum flow rate condition is 2.3 mL/min; the bar graph shows recoveries on each cycle while the line graph shows accumulate recoveries.

DETAILED DESCRIPTION OF THE INVENTION

Figures 1A, 1B:
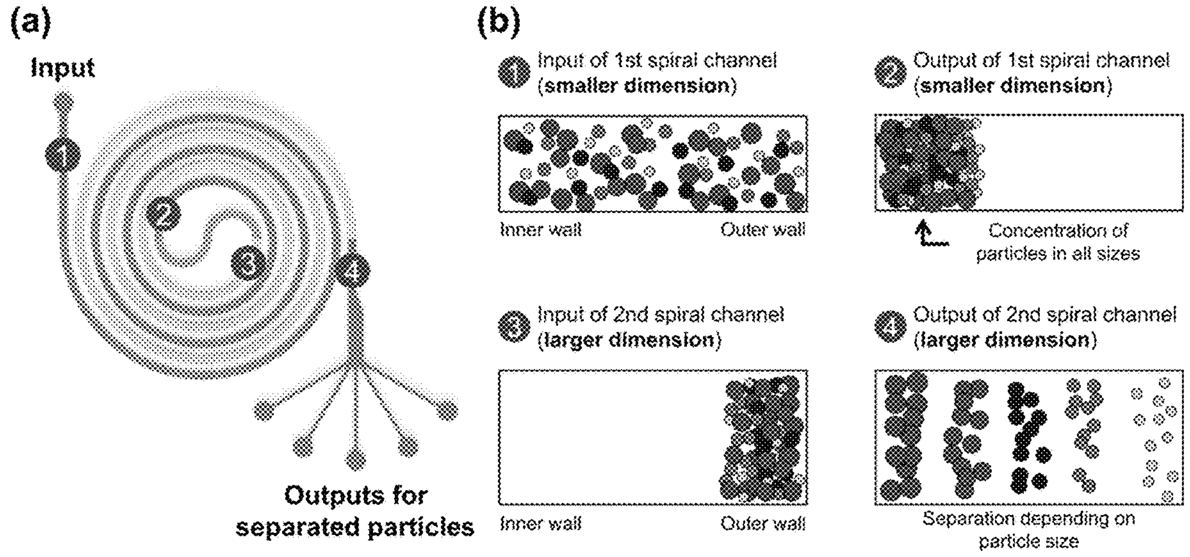
FIGS. 1A and 1B provide an overview of the multi-dimensional double spiral (MDDS) device.

A description of preferred embodiments of the invention follows.

As used herein, the words "a" and "an" are meant to include one or more unless otherwise specified. For example, the term "a cell" encompasses both a single cell and a combination of two or more cells and, the term "a multi-dimensional double spiral" refers to both a single multidimensional double spiral (MDDS) as well as a plurality of multidimensional double spirals.

The term "particle" and "particles" includes, but is not limited to, cells, beads, viruses, organelles, nanoparticles, and molecular complexes. The term "particle" or "particles" can include a single cell and a plurality of cells. Cells can include, but are not limited to, bacterial cells, blood cells, sperm cells, cancer cells, tumor cells, mammalian cells, protists, plant cells, and fungal cells.

A "patient" is an animal to be treated or diagnosed or in need of treatment or diagnosis, and/or from whom a biofluid is obtained. The term "patient" includes humans.

A device comprising a multi-dimensional double spiral (MDDS) can be referred to herein as an "MDDS device."

The first inlet of the first spiral microchannel of an MDDS can also be referred to herein as "the first inlet of the MDDS device," "the inlet of the MDDS device," or as "the inlet." In embodiments where the device comprises multiple multidimensional double spirals (e.g., the quad-version described herein), the inlet of each first spiral microchannel of the multidimensional double spiral can be referred to as the "first inlet" or simply as the "inlet." Where the device comprises multiple multidimensional double spirals, the "first inlet" of a MDDS can be shared by two or more multidimensional double spirals as discussed below.

Spiral microchannels, devices comprising such channels, and methods for the use of thereof have been described, for example, in Lim et al., WO2011/109762A1; 9 Sep. 2011; Birch et al., WO 2013/181615; 5 Dec. 2013, Han et al., WO 2014/046621 A1; 27 Mar. 2014, Hou et al., WO 2014/

152643 A1; 25 Sep. 2014; Voldman et al., WO 2015/156876 A2; 15 Oct. 2015; Warkiani et al., WO 2016/044537 A1; 24 Mar. 2016; Warkiani et al., WO 2016/044555 A1; 24 Mar. 2016; Sarkar et al., WO 2016/077055 A1; 19 May 2016; Ryu et al., US20180128723 A1, 10 May 2018; and Khoo et al., US20180136210 A1; 17 May 2018; which are each incorporated by reference in their entirety. In microfluidic devices, particles flowing in curvilinear (such as spiral) channels are influenced by both inertial migration and secondary Dean flows. The combination of Dean flow and inertial lift results in focusing and positioning of particles at distinct positions for concentration and separation applications.

Spiral microfluidic devices have been widely utilized for sample preparation mainly as a concentrator or a separator. In such spiral devices, the particle focusing position is predominantly determined by the ratio of particle size and channel dimension; the smaller the channel dimensions, the smaller the particles that can be focused on the inner wall side. The present invention is directed to a multi-dimensional double spiral (MDDS) device, for example, in which a mixture of particles are concentrated during their passage through a first smaller-dimensional spiral channel and then separated according to their sizes during passage through the second larger-dimensional spiral channel. The devices described herein can integrate two different functions, sample concentration and separation, into a single device with one inlet configuration, and without the need of additional sheath flow. Thus, in certain aspects, the first inlet of the first spiral microchannel is the only inlet (e.g., for each multidimensional double spiral). In addition to possessing the advantages of conventional spiral devices (such as high throughput and simple operation), the devices described herein can provide better separation performance (e.g., separation resolution, separation efficiency, separation distance, shaper and narrow particles bands or streams) and/or can be utilized to separate particles having a wide target size range (including intermediate CR ranges) as compared to the conventional spiral devices.

As discussed above, the invention encompasses a spiral microfluidic device comprising a multidimensional double spiral (MDDS) device, wherein the MDDS device comprises:

a. a first spiral microchannel comprising a first inlet;
b. a second spiral microchannel in fluid communication with the first spiral microchannel and comprising an inner wall outlet and an outer wall outlet, wherein the inner wall outlet is located on the inner wall side of the microchannel and outer wall outlet is located on the outer wall side of the microchannel; and
c. a transition region, wherein the transition region is a microchannel that connects the first and second spiral microchannels, wherein the output from the first spiral microchannel is directed into the second spiral microchannel in the transition region;

wherein the first spiral microchannel has a smaller cross-sectional area than the second spiral microchannel; wherein the cross-sectional area of the first spiral microchannel remains constant along its length (e.g., from the inlet to the transition region) and wherein the cross-sectional area of the second spiral microchannel remain constant along its length (e.g., from the transition region to the outlet); and wherein the device is configured to separate particles from a sample fluid comprising a mixture of particles. The first spiral microchannel and the second spiral microchannel are connected sequentially by the transition region such that output from the first spiral microchannel flows into the transition region and then, from the transition region, directly into the second spiral microchannel. In certain specific aspects, the first spiral microchannel is configured to concentrate particles into a concentrate particle stream (for example, on the inner wall side of the first spiral microchannel) and the second spiral microchannel is configured to separate the particles in the concentrated particle stream based on the particle sizes (for example, depending on the dimensions of the second spiral microchannel, particles having the larger particle sizes are directed to the inner wall side of the second spiral microchannel). It is to be understood that the transition region is a region that connects the first and second microchannels; in some examples, the transition region can be considered part of the first spiral microchannel and/or part of the second spiral microchannel.

The invention also includes a method of separating particles from a sample fluid comprising a mixture of particles, the method comprising the steps of:

a. introducing the sample fluid into the inlet of the first spiral microchannel of a multi-dimensional double spiral device described herein;
b. directing the sample fluid through the first spiral microchannel to the transition region of the device and into the second spiral microchannel; and
c. directing a first particle stream to the inner wall outlet and directing a second particle stream to the outer wall outlet.

The first particle stream (directed to the inner wall outlet) can comprise particles having a larger average diameter than that of the particles in the second particle stream.

The sample fluid is introduced into the first spiral microchannel via the first inlet; optionally, the sample fluid is placed in an inlet/input reservoir and the first inlet is in fluid communication with the inlet/input reservoir. In certain specific embodiments, the inlet/input reservoir is a syringe and the sample fluid is infused into the first spiral microchannel by actuating the syringe. The first spiral microchannel is connected sequentially or in series to the second spiral microchannel by a microchannel transition region. The dimensions or cross-sectional area of the second spiral microchannel are larger than that of the first spiral microchannel. The particles can be concentrated into a concentrated particle stream as they pass through the first spiral microchannel and can be separated based on their sizes as they pass through the second spiral microchannel. For example, FIG. 1A shows an example of the configuration of the first and second spiral microchannels (where the first spiral microchannel has smaller dimensions than the second spiral microchannel) and the movement of particles/particle streams as they pass through the microchannels. When a sample fluid containing various sizes of particles is introduced into the first spiral microchannel via the inlet, the particles can have a relatively large confinement ratio ($CR=a/D_h$, where a is the particle diameter and $D_h$ is the hydraulic diameter of microchannel) because the dimensions or cross-sectional area of the first spiral microchannel are small. In the first spiral microchannel, the particles become concentrated close to the inner wall side of the channel and have almost same or similar equilibrium locations. By passing through the S-shaped transition region, the concentrated particles on the inner wall side of the first spiral microchannel enter the outer wall side of the second spiral channel. As a result, the particle stream enters the second spiral microchannel in a concentrated band near the outer wall side, as if focusing the sample by the use of additional sheath flow. In the second spiral microchannel which has larger dimensions/cross-sectional area than the first spiral microchannel, the particle's CR value decreases due to the increased channel size, resulting in the equilibrium location's shift toward the outer wall side of the channel. As a result, particles form concentrated bands at different equilibrium locations depending on their sizes, which is a similar mechanism with the two-inlets spiral device with an additional sheath flow.[4,8,11,12]

The inner wall is the side wall of the channel that is on the side of the microchannel that is closer to the center of the spiral (e.g., the radially inner side) whereas the outer wall is the side wall of the channel that is on the side of the microchannel that is closer to the outside or periphery of the spiral (e.g., the radially outer side). An inner wall outlet is an outlet situated or configured such that a stream on the inner wall side of the channel is directed to the inner wall outlet. An outer wall outlet is an outlet situated or configured such that a stream on the outer wall side of the channel (or a stream other than that on the inner wall side) is directed to the outer wall outlet. Where the device comprises more than two outlets, the term "inner wall outlet" refers to the outlet closest to the inner wall. Similarly, when the device comprises more than two outlets, the term "outer wall outlet" refers to the outlet closest to the outer wall. The outlet(s) situated between the inner wall outlet and the outer wall outlet are referred to herein as the middle outlet(s). In devices configured like that of FIG. 1A, the largest particles (e.g., the particles having the largest average diameter) of the mixture are focused on the inner wall side of the second spiral microchannel and can be collected from the inner wall outlet, and the smallest particles (e.g., particles having the smallest average diameter) of the mixture are focused on the outer wall side and can be collected from the outer wall outlet. Particles of intermediate sizes (e.g., particles having average diameters between those of the largest and smallest particles of the mixture) are focused in stream(s) between the inner wall side and the outer wall side and can be collected in one or more middle outlets (situated between the inner wall outlet and the outer wall outlet) depending on their sizes. For example, if there is more than one particle stream of intermediate sized particles and two middle outlets, then the stream with the larger sized particles of the intermediate sized particles is directed to the middle outlet closer to the inner wall and the stream with the smaller sized particles is directed to the middle outlet closer to the outer wall. FIG. 1A shows a configuration with three middle outlets.

In certain additional aspects, the first spiral microchannel and the second spiral microchannel are nested together. In certain preferred aspects, the first spiral microchannel and the second spiral microchannel are nested together (for example, a Fermat spiral) and optionally, the transition region is S-shaped. The first spiral microchannel can, for example, spiral in the counter-clockwise direction, change direction at the transition region (for example, in the S-shaped transition region), and then the second spiral microchannel spirals in the clockwise direction (e.g., see FIG. 1). Alternatively, the first spiral microchannel can spiral in the clockwise direction, change direction at the transition region, and then second spiral microchannel spirals in the counter-clockwise direction.

In yet additional aspects, the second spiral microchannel is parallel to the first microchannel. In yet further aspects, the second spiral microchannel is positioned over or under the first spiral microchannel. The first spiral microchannel can spiral in a clockwise or counter-clockwise direction and the second spiral microchannel can spiral in the same or in the opposite direction to that of the first spiral microchannel.

Depending on the configurations of the spiral microchannels, the inlet of the first spiral microchannel can be on the circumference or periphery (outside of the spiral) of the first spiral microchannel or on the inside or center of the spiral microchannel. In addition, depending on the configuration of the spiral microchannel, the outlets can be on the circumference (outside of the spiral) of the second spiral microchannel or on the inside of the second spiral microchannel. In certain specific aspects, the first spiral microchannel and the second spiral microchannel are nested together and optionally, the transition region is S-shaped, and the inlet and the outlets are on the circumference of the channel.

The first and second spiral microchannels can each independently have a rectangular cross-section or a non-rectangular cross-section. For example, the first and second microchannels can both have a rectangular cross-section. In another example, the first and second microchannels can both have a non-rectangular cross-section, for example, both microchannels can have a trapezoidal cross-section. In yet another example, the first microchannel has a rectangular cross-section and the second microchannel has a non-rectangular cross-section. Microfluidic systems with non-rectangular cross-sections are described, for example, in WO2014/046621, the contents of which are incorporated by reference herein. By designing appropriate channel parameters, small particles/cells are trapped in the vortex at the outside of the microchannel wall (the outer wall) and larger particles focus along the inner microchannel wall.

An example of a non-rectangular cross-section is a trapezoidal cross-section. An additional example of a non-rectangular cross-section is a triangular cross-section. In certain aspects, the first spiral microchannel has a rectangular cross-section and the second spiral microchannel has a trapezoidal cross-section. In additional aspects, the first spiral microchannel has a trapezoidal cross-section and the second spiral microchannel has a trapezoidal cross-section. Microfluidic systems with trapezoidal cross-sections are described, for example, in WO2014/046621, the contents of which are incorporated by reference herein. In some examples, the trapezoidal cross section can be defined by a radially inner side, a radially outer side, a bottom side, and a top side, the cross section having a) the radially inner side and the radially outer side unequal in height, or b) the radially inner side equal in height to the radially outer side, and wherein the top side has at least two continuous straight sections, each unequal in width to the bottom side. In certain aspects, the cross-section of the curvilinear microchannel has (a) the height of the radially inner side larger than the height of the radially outer side, or (b) the height of the radially inner side is smaller than the height of the radially outer side, or (c) the top side includes at least one step forming a stepped profile, or (d) the top side includes at least one shallow region in between the radially inner side and the radially outer side. In further aspect, the trapezoidal cross-section is a right trapezoidal cross section.

As described above, the dimensions and/or cross-sectional area of the first spiral microchannel is less than that of the second spiral microchannel. For example, when both spiral microchannels have a rectangular cross-section, the width and/or height (also referred to as the depth) of the first spiral microchannel is less than that of the second spiral microchannel. In another example, where the first spiral microchannel has a rectangular cross-section and the second spiral microchannel has a trapezoidal cross-section, the cross-sectional area of the first spiral microchannel is less than that of the second spiral microchannel. This is illustrated in the channel configuration described in Examples where the first spiral channel has a rectangular cross-section with a width of 800 μm width and a height of 60 μm and the second spiral channel has a trapezoidal cross-section with a width of 800 μm, and heights of 80 and 120 μm for the inner wall side and the outer wall side, respectively.

The devices and methods can be used to separate particles having large, intermediate, and/or small confinement ratios. Focused particle streams comprising particles of different sizes and/or different confinement ratios can be separated from each other and directed to one or more different outlets. The confinement ratio is the ratio of the particle diameter and $D_h$, wherein $D_h$ is the hydraulic diameter of the microchannel. A large CR is, for example, greater than or equal to about 0.07. A small CR is, for example, less than 0.07. An intermediate CR is, for example, less than about 0.07 and greater than or equal to 0.01. In certain aspects, the device is configured such that at least one of the particle streams directed to an outlet (for example, the outer wall outlet or a middle outlet) comprises or consists of particles having a small CR and such that another particle stream directed to a different outlet (for example, the inner wall outlet) comprises or consists of particles having a large CR. In yet additional aspects, the device is configured such that at least one of the particle streams directed to an outlet (for example, the outer wall outlet or a middle outlet) comprises or consists of particles having an intermediate CR and such that another particle stream directed to a different outlet (for example, the inner wall outlet) comprises or consists of particles having a large CR. The outlets to which different particle streams will be directed depends on the equilibrium positions of the particles. In certain aspects, the device is used or configured such that particles having a small CR can be separated from other particles in the mixture (for example, from large CR particles). In yet additional aspects, the device is used or configured such that particles having large CR can be separated from other particles in the mixture (for example, from particles having a small CR or an intermediate CR). In yet further aspects, the device is used or configured such that particles having intermediate CR can be separated from other particles in the mixture (for example, from particles having a large CR).

Figure 13:
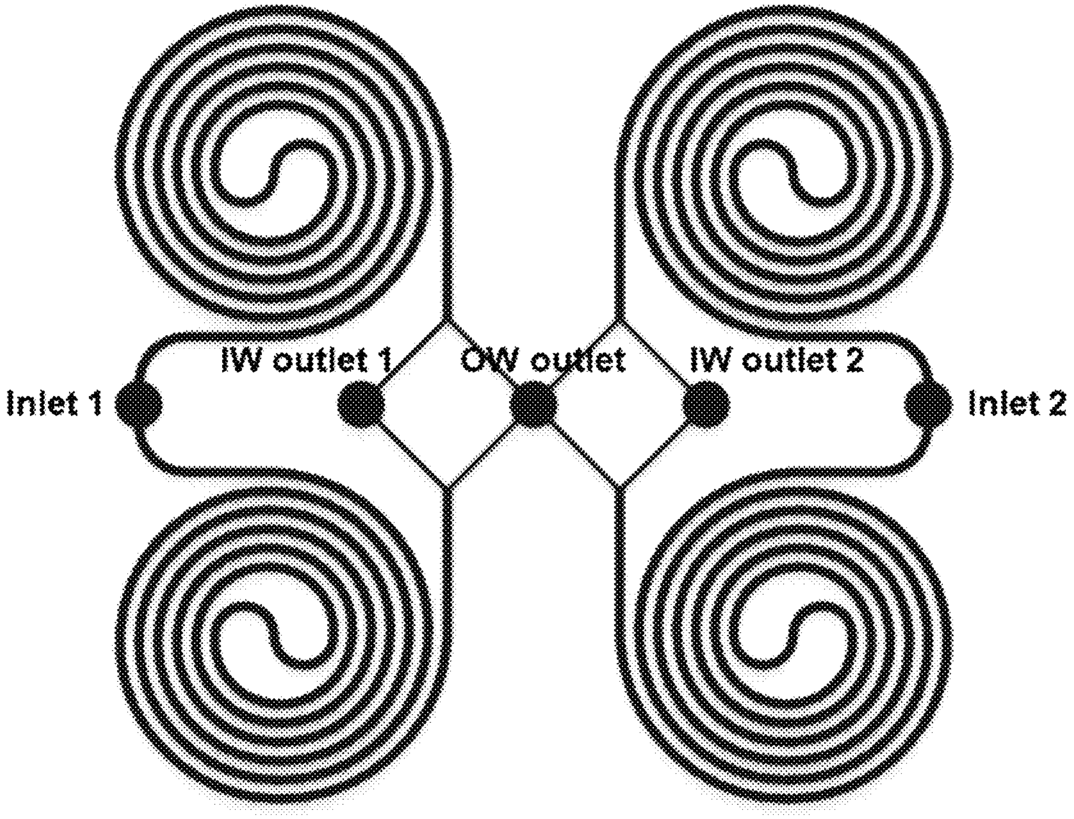
FIG. 13 shows the quad-version of MDDS device in which two of the four double spirals share an inlet (Inlet 1) and an inner wall (IW) outlet (IW outlet 1). The other two of the four double spirals share an inlet (Inlet 2) and an inner wall (IW) outlet (IW outlet 2). In this configuration, the four double spirals share the same outer wall (OW) outlet.

The MDDS device can comprise a single multidimensional double spiral or a plurality of multidimensional double spirals. In certain aspects, the device comprises, one, two, three, four, five, six, seven, eight, ten, twelve, or sixteen multidimensional double spirals. A device comprising a plurality of multidimensional spirals can be used, for example, to increase throughput and/or reduce operation time. Each multidimensional double spiral can have its own first inlet or can share a first inlet with one or more multidimensional double spirals. Similarly, each multidimensional double spiral can have its own inner wall outlet and/or outer wall outlet or can share the same inner wall outlet and/or the same outer wall outlet with one or more multidimensional double spirals. Thus, multiple different configurations are possible. In certain specific aspects, the device comprises at least two multi-dimensional double spirals, wherein each first inlet is in fluid communication with the sample fluid, for example, the sample fluid in an input reservoir. In specific embodiments, the device comprises four multi-dimensional spirals wherein each first inlet is in fluid communication with the sample fluid. The sample fluid can, for example, be introduced into each inlet by placing the sample fluid in an input reservoir that is in fluid communication with the inlet. A set of four multi-dimensional spirals is referred herein as a "quad-version" of the MDDS device. In yet other aspects, the device comprises eight multi-dimensional spirals; the eight multi-dimensional spirals can, for example, be made up from two quad-version of the MDDS devices. As discussed above, where the device comprises at least two multi-dimensional double spirals, the inlet(s) and/or outlet(s) for the double spiral can be combined or shared for simpler operation. For example, all or a subset of the double spirals can share an inlet and/or share an outlet (e.g., the inner wall outlet and/or the outer wall outlet). In certain specific embodiments, the device comprises four multi-dimensional double spirals wherein the inlet(s) of the device is in fluid communication with the sample fluid and/or the output reservoir from which fluid is recirculated. A non-limiting example of a device comprising four multi-dimensional double spiral (referred to herein as the quad-version) is shown in FIG. 13. This figure shows an exemplary quad-version in which two of the four double spirals share an inlet (Inlet 1) and an inner wall (IW) outlet (IW outlet 1). The other two of the four double spirals share an inlet (Inlet 2) and an inner wall (IW) outlet (IW outlet 2). In this configuration, the four double spirals share the same outer wall (OW) outlet. As discussed above, in other aspects, each double spiral has its own inlet and/or each double spiral has its own inner wall outlet and/or outer wall outlet.

In certain specific aspects, the closed loop recirculation is provided by a recirculation system that comprises a check-valve where only one direction of flow is allowed while the opposite direction of flow is blocked by the internal membrane. In the examples below, a dual-check-valve was used and included two different check-valves so that, once separated, output in the output reservoir can be extracted back into the input syringe at the withdrawal motion of a syringe pump and processed again through the MDDS device at the infusion motion of a syringe pump, resulting in higher purity and concentration.

As discussed above, the invention includes a microfluidic device comprising a multidimensional double spiral (MDDS) device as described herein, wherein the first spiral microchannel of the MDDS device is configured to concentrate the particles into a concentrated particle stream and the second spiral microchannel is configured to separate particles from the concentrated particle stream based on their sizes and wherein the device further comprises a system for closed loop recirculation, wherein the inner wall outlet of the MDDS device is in fluid communication with a first output reservoir and the outer wall outlet is in fluid communication with a second output reservoir, wherein the system for closed loop recirculation recirculates the fluid from the first output reservoir into the inlet of the first microchannel, and comprises:

a syringe in fluid communication with the first output reservoir and the inlet of the first spiral microchannel;

a first check valve positioned between and in fluid communication with the first output reservoir and the syringe; and a second check valve positioned between and in fluid communication with the syringe and the inlet of the first spiral microchannel. In certain embodiments, the MDDS device comprises one or more middle outlets.

A check valve permits only one direction of flow while the opposite direction of flow is blocked, for example, by an internal membrane. The first check valve permits flow in the direction from the first output reservoir to the syringe and blocks flow in the direction from the syringe to the first output reservoir. The first check valve can comprise an inner membrane that blocks flow in the direction from the syringe to the first output reservoir when the syringe is actuated to infuse the fluid into the inlet of the first spiral channel. The second check valve permits flow in the direction from the syringe to the inlet of the first spiral microchannel and blocks flow in the direction from the inlet of the first spiral channel to the syringe. The second check valve can comprise an inner membrane that blocks flow in the direction from the inlet of the first spiral channel to the syringe when the syringe is actuated to withdraw the fluid from the first output reservoir into the syringe.

As will be understood, the device can also be configured such that the system for closed loop recirculation recirculates fluid from the second output reservoir (comprising particle have a smaller average diameter than the particles in the first output reservoir) into the MDDS device. Thus, the invention also encompasses a microfluidic device comprising a multidimensional double spiral (MDDS) device as described herein, wherein the first spiral microchannel of the MDDS device is configured to concentrate the particles into a concentrated particle stream and the second spiral microchannel is configured to separate particles from the concentrated particle stream based on their sizes and wherein the device further comprises a system for closed loop recirculation,

- wherein the inner wall outlet of the MDDS device is in fluid communication with a first output reservoir and the outer wall outlet is in fluid communication with a second output reservoir,
- wherein the system for closed loop recirculation recirculates the fluid from the second output reservoir into the inlet of the first microchannel, and comprises:
- a syringe in fluid communication with the second output reservoir and the inlet of the first spiral microchannel;
- a first check valve positioned between and in fluid communication with the second output reservoir and the syringe; and
- a second check valve positioned between and in fluid communication with the syringe and the inlet of the first spiral microchannel. In certain embodiments, the MDDS device further comprises one or more middle outlets. In the embodiment where fluid from the second output reservoir is recicrculated, the first check valve permits flow in the direction from the second output reservoir to the syringe and blocks flow in the direction from the syringe to the second output reservoir. For example, the first check valve can comprise an inner membrane that blocks flow in the direction from the syringe to the second output reservoir when the syringe is actuated to infuse the fluid into the inlet of the first spiral channel. The second check valve permits flow in the direction from the syringe to the inlet of the first spiral microchannel and blocks flow in the direction from the inlet of the first spiral channel to the syringe. The second check valve can comprise an inner membrane that blocks flow in the direction from the inlet of the first spiral channel to the syringe when the syringe is actuated to withdraw the fluid from the second output reservoir into the syringe.

The invention also includes a method of separating particles from a sample fluid comprising a mixture of particles, the method comprising the steps of:

- a. introducing the sample fluid into the inlet of the first spiral microchannel of the MDDS device comprising the system for closed loop recirculation as described herein,
- b. directing the sample fluid through the first spiral microchannel to the transition region of the device and into the second spiral microchannel, and
- c. directing a first particle stream to the inner wall outlet and directing a second particle stream to the outer wall outlet, and optionally wherein the first particle stream comprises particles having a larger average diameter than that of the particles in the second particle stream;
- wherein the inner wall outlet directs the first particle stream to the first output reservoir and the outer wall outlet directs the second particle stream to the second output reservoir,
- wherein the fluid in the first output reservoir or the second output reservoir is recirculated by actuating the syringe to withdraw the fluid from the first output reservoir or the second output reservoir (depending on which output fluid is to be recirculated) and infuse the fluid into the inlet of the first spiral microchannel. In certain embodiments, the MDDS device comprises one or more middle outlets to which one or more particle streams comprising particles of intermediate size are directed.

As referred to herein, actuation of the syringe can refer to withdrawal motion (e.g., withdrawing fluid from one of the output reservoirs) and/or infusion motion (e.g., infusion into the inlet of the first spiral microchannel). Back-and-forth motions (in other words, withdrawal and infusion motions) of the syringe and/or syringe pumps result in recirculation of fluid from the first output reservoir or the second output reservoir into the MDDS device by withdrawing fluid from the first output reservoir or the second output reservoir into the syringe and then infusing that fluid into the inlet of the first microchannel. Each time all or substantially all of the fluid in the first output reservoir or second output reservoir is recirculated in the MDDS device, a cycle of recirculation is completed. The fluid collected after being directed through the MDDS device (either after first passage through the device or after one or more cycles of recirculation) can be referred to herein as the “final output” or “final output fluid.” The methods described herein can comprise no cycle of recirculation or one or more cycles of recirculation. In certain aspects, the method entails one, two, three, four, five, six, seven, or eight cycles of recirculation. The number of cycles of recirculation can depend on a number of factors including, but not limited to, the desired particle separation in the final output, the desired particle purity in the final output, the desired particle concentration in the final output, the desired particle recovery in the final output, time of operation, the number of MDDS devices, etc.

The first and second check valves allow fluid from the output reservoir (either the first output reservoir or the second output reservoir) to be extracted into the syringe at the withdrawal motion of the syringe (or the syringe pump) and processed again through the MDDS device at the infusion motion of the syringe (or the syringe pump) while blocking flowing in the opposite directions, for example, toward the output reservoir from the syringe (in the case of the first check valve) and toward the syringe from the inlet of the MDDS device (in the case of the second check valve). In certain embodiments, the first check valve and second check valve can be part of the same check valve assembly or unit, for example, like the dual check valve described in the Examples section below.

In yet further aspects, the device can include one or more additional check valves. For example, for the device that comprises the system for closed loop recirculation that recirculates fluid from the first output reservoir, the additional check valve can be positioned between and in fluid communication with the inner wall outlet and the second output reservoir; this additional check valve can block flow from the second output reservoir in the direction of the first output reservoir while permitting flow from the outlet to the second output reservoir. Alternatively, for the device comprising the system for closed loop recirculation that recirculates fluid from the second output reservoir, the additional check valve can be positioned between and in fluid communication with the inner wall outlet and the first output reservoir; this additional check valve can block flow from the first output reservoir in the direction of the second output reservoir while permitting flow from the outlet to the first output reservoir.

The device comprising the system for closed loop recirculation can comprise a single multidimensional double spiral or a plurality of multidimensional double spirals. In certain aspects, the device comprises, one, two, three, four, five, six, seven, eight, ten, twelve, or sixteen multidimensional double spirals. Thus, multiple different configurations are possible. In certain specific embodiments, the device comprises four multi-dimensional double spirals wherein the inlet(s) of the device is in fluid communication with the sample fluid and/or the output reservoir from which fluid is recirculated. Each multidimensional double spiral can have its own first inlet or can share a first inlet with one or more multidimensional double spirals of the device. Similarly, each multidimensional double spiral can have its own inner wall outlet and/or outer wall outlet or can share the same inner wall outlet and/or the same outer wall outlet with one or more multidimensional double spirals. The device comprising a plurality of multidimensional spirals as described herein can be configured to provide closed loop recirculation of the sample fluid through the first spiral microchannel of each multidimensional double spiral as described herein. For example, each inner wall outlet of the device is in fluid communication with a first output reservoir and each outer wall outlet of the device is in fluid communication with a second output reservoir, and the system for closed loop recirculation recirculates the fluid from the first output reservoir or the second output reservoir into the first inlet(s) of device.

The sample fluid can, for example, be introduced into the inlet by placing the sample fluid in an input reservoir that is in fluid communication with the first inlet(s). Such an input reservoir can, for example, be a syringe and the infusion motion of the syringe can introduce the sample fluid into the inlet of the first spiral microchannel. In the Examples, a set of four multi-dimensional spirals is referred to a quad-version of the MDDS device. In yet other aspects, the device comprises eight multi-dimensional spirals; the eight multi-dimensional spirals can, for example, be made up from two quad-version of the MDDS devices.

In yet further aspects, the syringe of the recirculation system is part of a syringe pump and/or withdrawal of the fluid from the first output reservoir and infusion into the inlet of the first spiral microchannel by the syringe is automated. In additional aspects, withdrawal of the fluid from the first output reservoir and infusion to the inlet by the syringe of the recirculation system is hand powered; optionally, a hand powered recirculation system can further comprise a pressure meter, for example, a pressure meter which monitors pressure applied at the inlet region.

In certain embodiments, the device comprises a support that connects the MDDS device, the syringe(s), and the check valves. Where the device comprises a plurality of multidimensional spirals, such as the quad-version of the MDDS device, the support can connect the plurality of MDDS devices, the syringe(s), and the check valves. The support can, for example, be made by 3D printing. Non-limiting examples of such supports (also referred to as "connectors") are shown in FIG. 12 and described in the Examples below.

In certain specific embodiments, the MDDS device including a device comprising the MDDS device and the system for recirculation is a portable device. Such a portable device can provide point-of-care convenience and can be particularly useful in resource-limited environments including rural areas and/or developing countries where access to health care and medical diagnostics is limited.

Various fluids comprising mixtures of particles can be used in the systems and methods described herein. Examples of mixtures include biological fluids or biofluids (e.g., a biological sample such as blood, lymph, serum, urine, mucus, sputum, cervical fluid, placental fluid, semen, spinal fluid, and fluid biopsy), liquids (e.g., water), culture media, emulsions, sewage, etc. In embodiments in which the biofluid is whole blood, the blood can be introduced unadulterated or adulterated (e.g., lysed, diluted). Other biological fluids or biofluids can also be used unadulterated or adulterated (e.g., the biofluid can be pre-treated in some way or diluted). For example, methods of lysing blood are known in the art. In certain aspects, the blood sample is diluted prior to introducing it into the inlet of the first microchannel.

The devices and methods can be used, for example, in the detection of biomarkers, microorganisms (e.g., bacterial cells, fungi, or viruses), and cells in biofluids including, but not limited to, blood, urine, saliva, and sputum. The devices and methods can be used, for example, for chemical process and fermentation filtration, water purification/wastewater treatment, sorting and filtering components of blood and other bio-fluids, concentrating colloid solutions, and purifying and concentrating environmental samples. In certain specific embodiments, the method can be used for separation of white blood cells from blood samples, detection of nucleated cells, detection of rare cells (e.g., circulating tumor cells) within blood samples, depletion of erythrocytes and recovery of leukocytes from G-CSF mobilized peripheral blood (PBSC), bone marrow (BM), and/or umbilical cord blood (UCB) prior to cryopreservation, removal of colloidal and supracolloidal residues from wastewater effluents, and filtration of pathogenic bacteria strains, such as *E. coli* O157:H7, from water.

In certain aspects, the biological fluid is semen. In specific methods, the device or method described herein can be used to separate sperm cells from other cells, such as immune cells, in the sample. Sperm cells can, for example, be separated based on their size and/or motility.

In yet additional aspects, the biological sample is a sputum sample. In specific embodiments, the device and/or method described herein separates and concentrates immune cells from the other cells in the sputum sample.

In specific embodiments the invention is directed to a method of separating leukocytes from a blood sample using an MDDS device as described herein. In certain specific embodiments, the invention includes a method of separating white blood cells from a blood sample using a microfluidic device comprising a MDDS and system for closed loop recirculation, wherein the inner wall outlet of the MDDS is in fluid communication with a first output reservoir and the outer wall outlet is in fluid communication with a second output reservoir, wherein the system for closed loop recirculation recirculates the fluid from the first output reservoir into the inlet of the first microchannel, and comprises:

a syringe in fluid communication with the first output reservoirs and the inlet of the first spiral microchannel; and a first check valve positioned between and in fluid communication with the first output reservoir and the syringe; and a second check valve positioned between and in fluid communication with the syringe and the inlet of the first spiral channel, the method comprising the steps of:

a. introducing the blood sample into the inlet of the first spiral microchannel of the MDDS, b. directing the blood sample through the first spiral microchannel to the transition region of the device and into the second spiral microchannel, and c. directing a first particle stream to the inner wall outlet and directing a second particle stream to the outer wall outlet, wherein the first particle stream comprises white blood cells and the second particle stream comprises red blood cells;

wherein the inner wall outlet directs the first particle stream to the first output reservoir and the outer wall outlet directs the second particle stream to the second output reservoir, wherein the fluid in the first output reservoir is recirculated by actuating the syringe to withdraw the fluid from the first output reservoir and infuse the fluid into the inlet of the first spiral microchannel.

In some embodiments, at least about 70%, at least about 75%, at least about 80%, at least about 85%, or at least about 90% of the white blood cells in the blood sample are recovered in the final output and/or the purity of the white blood cells in the final output is at least about 70%, at least about 75%, at least about 80%, at least about 85%, or at least about 90%. As described herein, combining the separation performances of the MDDS device and the advantages of a check-valve-based recirculation method, the developed separation platform shows remarkable results on the isolation of leukocytes (WBCs) in the peripheral blood from the abundant erythrocytes (RBCs). Because the platform can be operated in the fully-automated and reliable manner without any human intervention using microliter quantities of human peripheral blood (50 μL), this is readily applicable to bedside or field use while allowing rapid isolation of intact, functional leukocytes amenable for functional assays. Moreover, the result of its hand-powered operation demonstrates its high applicability as a portable point-of-care (POC) device, especially for sample preparation in resource-limited environments. Also, by altering channel dimensions of the MDDS devices, separation cut-off size can be controlled so that the developed platform could be adaptable for various sample preparation applications using not only blood but also other bio-fluids including saliva, sputum, and semen. Therefore, it is believed that the developed separation platform could be used as an innovative tool to replace conventional sample preparation methodologies.

Exemplary flow rates for the MDDS devices can be in a range of between about 0.5 mL/min and about 1 L/min, such as between about 0.5 mL/min and about 10 mL/min, or between about 0.5 mL/min and about 3 mL/min.

As discussed above, multiple multi-dimensional double spirals (including the first spiral microchannel and the second spiral microchannel) can be combined into a microfluidic device. In other aspects, multiple sets of channels can be combined into a multiplexed microfluidic device. For example, the first and second spiral microchannels can be located on a support thereby creating a first layer and a plurality of such layers comprising a first and a second spiral microchannels is stacked and optionally, the inlets of each first spiral microchannel of each layer are in fluid communication with the sample fluid. In another example, multi-layered MDDS devices can be made by stacking single-layered MDDS devices (such single-layered MDDS devices can be a single MDDS device or can be multiple MDDS devices configured in a single layer). For example, a plasma bonding method can be used for attachment of silicon devices, and double-sided film can be used for attachment of plastic devices to one another and optionally to a support.

As described above, in certain aspects, the second spiral microchannel has a non-rectangular or trapezoidal cross-section thereby resulting in the alteration of the shapes and positions of the Dean vortices which generates new focusing positions for particles. For example, as described herein, a curved microchannel with a deeper inner side (along the curvature center) and a shallow outer side generates two strong Dean vortex cores near the inner wall, trapping all particles irrespective of size within the vortex. A spiral microchannel with a shallow inner side and a deeper outer side skews the vortex centers near the outer wall at the outer side and can entrain particles and cells within the vortex. However, larger particles with dominant inertial force are focused near the inner channel walls, similar to rectangular cross-section channels. Thus, by designing appropriate channel parameters, small particles/cells are trapped in the vortex at the outside wall, while relatively large particles focus along the inner microchannel wall. The threshold diameter determining whether a particle/cell is trapped within the Dean vortex or focused towards the inner channel wall is dependent on the flow rate. This enables a device to achieve good separation resolution between mixtures having a wide range of particle sizes. A trapezoidal cross-section facilitates higher particle/cell concentrations.

Figures 4A, 4B, 4C, 4D:
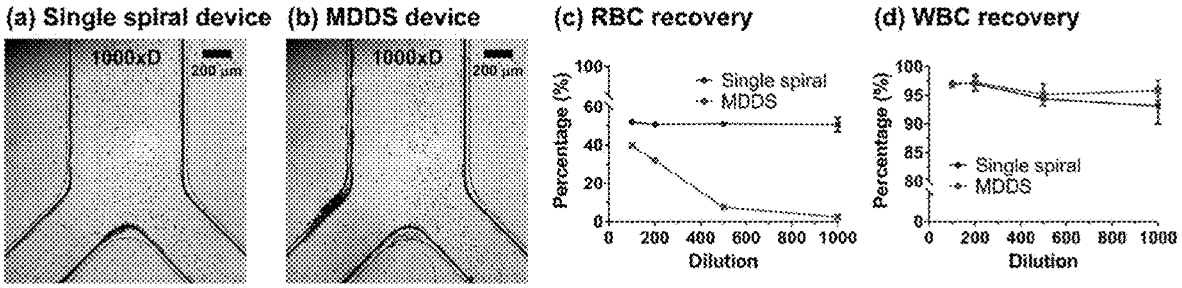
FIGS. 4A to 4D show separation performance on blood samples in the MDDS device compared with the single spiral device. Microscopic images of 1000× diluted blood sample in the single spiral (FIG. 4A) and the MDDS devices (FIG. 4B).

In certain aspects, the separation resolution obtained using the MDDS device described herein is greater than that of a device comprising a first spiral microchannel and a second spiral microchannel having the same cross-sectional areas (for example, a device having two spiral microchannels of the same dimensions or cross-sectional area as the second spiral microchannel of the MDDS device) but that is otherwise identical to the multi-dimensional double spiral microfluidic device. In yet additional aspects, the separation resolution obtained using the MDDS device described herein is greater than that of a device comprising only the second spiral microchannel of the MDDS and that is otherwise identical to the MDDS device. In some embodiments, a MDDS device as described herein has greater separation resolution as compared to a device having single spiral microchannel, wherein the single spiral microchannel has the same dimensions as the second spiral microchannel of the MDDS device. For example, as shown in FIGS. 4A and 4B, red blood cells (RBCs) can be more effectively extracted into the outer wall side of the channel in the MDDS device as compared to the single spiral device with a low percentage (by volume) of RBCs in the inner wall side outlet.

Fluid flowing through a channel with a laminar profile has a maximum velocity component near the centroid of the cross section of the channel, decreasing to zero near the wall surface. In a curved channel, the fluid experiences centrifugal acceleration directed radially outward. Since the magnitude of the acceleration is proportional to quadratic velocity, the centrifugal force in the centroid of the channel cross section is higher than at the channel walls. The non-uniform centrifugal force leads to the formation of two counter-rotating vortices known as Dean vortices in the top and bottom halves of the channel. Thus, particles flowing in a spiral channel experience a drag force due to the presence of these transverse Dean flows. Under Stokes' law, the drag force will be proportional to the Dean velocity at that point and proportional to the diameter of the particle. In the absence of other dominating forces, the Dean drag force will drive particles along the direction of flow within the vortex and finally entrain them within the core. In high aspect ratio rectangular cross section channels, this motion can be observed by observing particles moving back and forth along the channel width between the inner and outer walls with increasing downstream distance when visualized from the top or bottom.

Apart from the Dean drag force, larger particles or cells with diameters comparable to the micro-channel dimensions also experience appreciable inertial lift forces resulting in their focusing and equilibration along the channel walls. In microchannels with curvilinear geometry, the interplay between the inertial lift force and the Dean drag force reduces the equilibrium positions to just two near the inner channel wall at low flow rate, and move outward with an increase in flow rate, each within the top and bottom Dean vortex. The two equilibrium positions overlay each other along the micro-channel height and are located at the same distance from the micro-channel inner wall for a given cell size, i.e. viewed as a single position across the micro-channel width.

Spiral microchannels with trapezoidal cross sections are different from rectangular cross section microchannels, in that the maximum velocity is asymmetric along the channel cross-section resulting in the formation of stronger Dean vortex cores skewed towards the deeper channel side. These vortex cores have high probability to entrain particles within them. In spiral channels with trapezoidal cross-section, the particle focusing behavior is different from that in a rectangular channel. In a trapezoidal channel, as shown in WO014/046621, particles focus near the inner channel wall at low flow rate (similar to channels with rectangular cross-section), while beyond a certain threshold flow rate, they switch to an equilibrium position located at the outer half.

Along the depth direction, according to experimental measurements, particles are focused between about 25.5 to about 27.1% of the channel depth at flow rates of about 0.5 to about 3.0 mL/min. This result indicates that the distance between the focused particle and the channel wall in a trapezoidal channel in the depth direction is larger than that in the rectangular channel.

If the inner wall of the channel is deeper, strong Dean vortices will appear at the inner side, i.e., particles will be trapped near the inner side, even at high flow rates. Curved channels with this cross section can be used to collect a larger size range of particles at the inner side of the outlet and filtered particle free liquid at the outer side of the outlet, finding numerous applications in water filtration, for example. On the other hand, if the outer wall of the channel is deeper, Dean vortices are skewed towards the outer side. At the inner side, the Dean flow field is much like that in a rectangular channel. At certain flow rates, the larger particle can focus along the inner wall influenced by both Dean flow and inertial lift, while the smaller particles tend to get trapped in the vortex center at the outer side.

Two typical regimes of focusing are based on particle size, the inertial dominant and Dean dominant regimes. For small particles (e.g., 5.78 μm particles), the large channel dimension prevented them from focusing and these particles got trapped in the Dean vortex even at low flow rate. The larger particles (e.g., about 9.77 μm particles) also could not focus at the inner wall and were trapped within the Dean vortices at flow rates greater than or equal to about 1 ml/min. For example, 15.5 μm particles focused at the inner wall at low flow rates, about 1.5 ml/min, but transitioned from the inertial dominant regime to Dean dominant regime at about 2 ml/min. For the same microchannel, the 26.25 μm particles transitioned from the inertial regime to Dean regime at flow rates about 3 ml/min. From these results, at a flow rate of about 1.5 ml/min, particles >about 15.5 μm can be separated from smaller ones by collecting from the inner and outer outlets separately. Similarly, at a flow rate of about 2.5 ml/min, about 26.25 μm particles can be separated from a mixture of about 26.25 μm and about 15.5 μm particles. In some aspects, a low flow rate can be in a range of between about 0.5 mL/min and about 2 mL/min. Thus, a low flow rate can be a flow rate of about 0.5 mL/min, about 0.6 mL/min, about 0.7 mL/min, about 0.8 mL/min, about 0.9 mL/min, about 1.0 mL/min, about 1.1 mL/min, about 1.2 mL/min, about 1.3 mL/min, about 1.4 mL/min, about 1.5 mL/min, about 1.6 mL/min, about 1.7 mL/min, about 1.8 mL/min, about 1.9 mL/min, or about 2.0 mL/min.

The principles of the MDDS device (e.g., the difference in cross-sectional area for the first and second microchannel) can be applied to channels of various different dimensions.

In certain examples, the spiral microchannels can each independently have a radius of curvature in a range of between about 2.5 mm and about 25 mm. For example, the spiral microchannel can have a radius of curvature of about 3 mm, about 4 mm, about 5 mm, about 6 mm, about 7 mm, about 8 mm, about 9 mm, about 10 mm, about 11 mm, about 12 mm, about 13 mm, about 14 mm, about 15 mm, about 16 mm, about 17 mm, about 18 mm, about 19 mm, about 20 mm, about 21 mm, about 22 mm, about 23 mm, about 24 mm, or about 25 mm. The spiral microchannel can also have a length in a range of between about 4 cm and about 100 cm. For example, the curvilinear microchannel can have a length of about 5 cm, about 10 mm, about 15 mm, about 20 mm, about 25 mm, about 30 mm, about 35 mm, about 40 mm, about 45 mm, about 50 mm, about 55 mm, about 60 mm, about 65 mm, about 70 mm, about 75 mm, about 80 mm, about 85 mm, about 90 mm, about 95 mm, or about 100 cm.

For a trapezoidal cross-section spiral microchannel, there are several factors that affect the focusing position and separation efficiency, such as the width of the microchannel, inner and outer depth of the microchannel cross-section, the radius of the spiral curvature, and the slant angle. In some examples, the width can be in a range of between about 100 μm and about 2000 μm, such as a width of about 200 μm, about 300 μm, about 400 μm, about 500 μm, about 600 μm, about 700 μm, about 800 μm, about 900 μm, about 1000 μm, about 1100 μm, about 1200 μm, about 1300 μm, about 1400 μm, about 1500 μm, about 1600 μm, about 1700 μm, about 1800 μm, or about 1900 μm.

In some examples, the outer depth can be in a range of between about 20 μm and about 200 μm, such as an outer depth of about 40 μm, about 60 μm, about 80 μm, about 100 μm, about 120 μm, about 140 μm, about 160 μm, or about 180 μm. The inner depth can be in a range of between about 20 μm and about 200 μm, such as an inner depth of about 40 μm, about 60 μm, about 80 μm, about 100 μm, about 120 μm, about 140 μm, about 160 μm, or about 180 μm. The radius of curvature can be in a range of between about 2.5 mm and about 25 mm, such as a radius of about 5 mm, about 7.5 mm, about 10 mm, about 12.5 mm, about 15 mm, about 17.5 mm, about 20 mm, or about 22.5 mm.

The slant angle is the angle between the top of the channel and the bottom of the channel. The slant angle can be in a range of between about 2 degrees and about 60 degrees.

Thus, the slant angle can be about 2 degrees, about 4 degrees, about 6 degrees, about 8 degrees, about 10 degrees, about 12 degrees, about 14 degrees, about 16 degrees, about 18 degrees, about 20 degrees, about 22 degrees, about 24 degrees, about 26 degrees, about 28 degrees, about 30 degrees, about 32 degrees, about 34 degrees, about 36 degrees, about 38 degrees, about 40 degrees, about 42 degrees, about 42 degrees, about 46 degrees, about 48 degrees, about 50 degrees, about 52 degrees, about 54 degrees, about 56 degrees, about 58 degrees, or about 60 degrees. The slant angle of the channel affects the focusing behavior in two ways: (i) the threshold flow rate required to trap particles in the Dean vortex as a function of particle size and (ii) the location of the Dean vortex core. A large slant angle (i.e., in a range of between about 10 degrees and about 60 degrees) will lead to strong Dean at the outer side and increase the particle trapping capability. A large slant angle can also decrease the threshold flow rate required to trap particles of a given size within the Dean vortex.

The cross section of the channel can be characterized by a height of the radially inner side that is larger than a height of the radially outer side, or vice versa. In yet other aspects, the profile of the cross section can be stepped, curved, convex, or concave.

In other aspects, the radially inner side and the radially outer side of the trapezoidal cross section can have a height in a range of between about 20 microns (μm) and about 200 μm. Thus, the height of the radially inner side 210 can be about 20 μm, about 40 μm, about 60 μm, about 80 μm, about 100 μm, about 120 μm, about 140 μm, about 160 μm, about 180 μm, or about 200 μm, and the height of the radially outer side 220 can be about 20 μm, about 40 μm, about 60 μm, about 80 μm, about 100 μm, about 120 μm, about 140 μm, about 160 μm, about 180 μm, or about 200 μm. In some aspects, the height of the radially inner side 210 can be about 70 μm, or about 80 μm, or about 90 μm, and the height of the radially outer side 220 can be about 100 μm, or about 120 μm, or about 130 μm, or about 140 μm.

In certain aspects, the top side and the bottom side of the trapezoidal cross section can have a width in a range of between about 100 μm and about 2000 μm, such as a width of about 200 μm, about 300 μm, about 400 μm, about 500 μm, about 600 μm, about 700 μm, about 800 μm, about 900 μm, about 1000 μm, about 1100 μm, about 1200 μm, about 1300 μm, about 1400 μm, about 1500 μm, about 1600 μm, about 1700 μm, about 1800 μm, ora width of about 1900 μm.

For microchannels having a rectangular cross-section, an exemplary aspect ratio is between about 0.05 and about 0.15; or between about 0.075 and about 0.125. Exemplary average heights can be about 50 to about 200 μm, or about 50 to about 120 μm. Exemplary average widths can be about 500 to about 1000 μm, for example, about 800 μm. In certain examples, the average height of the rectangular microchannel is about 60 μm and the average width is about 800 μm, or the average height is about 100 μm and the average width is about 800 μm. Other aspect ratios, heights and widths can also be employed for a rectangular microchannel.

Spiral microchannels can comprise one or more loops. In certain aspects, each of the spiral microchannel can independently be a 2 loop microchannel, a 3 loop microchannel, a 4 loop microchannel a 5 loop microchannel, a 6 loop microchannel, a 7 loop microchannel, an 8 loop microchannel, a 9 loop microchannel, a 10 loop microchannel, etc. The device can, for example, comprise 6-loop or 8-loop spiral microchannels with one inlet and two or more outlets with a radius of curvature decreasing from about 24 mm at the inlet to about 8 mm at the two outlets for efficient cell migration and focusing. The width of the channel cross-section can be about 600 μm and the inner/outer heights can be about 80 μm and about 130 μm, respectively, for the trapezoid cross-section.

A variety of particles can be separated using the microfluidic devices described herein. In a particular aspect, larger particles can be separated from smaller particles (e.g. particles have a large CR can be separated from particles having an intermediate or small CR). In certain aspects, larger particles can have a diameter from about 18 μm to about 50 μm. For example, larger particles can have a diameter of about 19 μm, about 20 μm, about 21 μm, about 22 μm, about 23 μm, about 24 μm, about 25 μm, about 26 μm, about 27 μm, about 28 μm, about 29 μm, about 30 μm, about 31 μm, about 32 μm, about 33 μm, about 34 μm, about 35 μm, about 36 μm, about 37 μm, about 38 μm, about 39 μm, about 40 μm, about 41 μm, about 42 μm, about 43 μm, about 44 μm, about 45 μm, about 46 μm, about 47 μm, about 48 μm, about 49 μm, or about 50 μm. In certain aspects, smaller particles can have a diameter from about 2 μm to about 14 μm. For example, smaller particles can have a diameter of about 2 μm, about 3 μm, about 4 μm, about 5 μm, about 6 μm, about 7 μm, about 8 μm, about 9 μm, about 10 μm, about 11 μm, about 12 μm, about 13 μm, or about 14 μm. In certain aspects, the flow rate can be about 2.5 mL/min, the larger particles can have a diameter in a range of between about 18 μm and about 40 μm, and the smaller particles can have a diameter in a range of between about 10 μm and about 20 μm. In another aspect, the flow rate can be about 1.5 mL/min, the larger particles can have a diameter in a range of between about 15 μm and about 25 μm, and the smaller particles can have a diameter in a range of between about 5 μm and about 10 μm. In still another aspect, the flow rate can be in a range of between about 2.5 mL/min and about 3.0 mL/min, the larger particles can have a diameter in a range of between about 25 μm and about 40 μm, and the smaller particles can have a diameter in a range of between about 5 μm and about 15 μm.

In some aspects, the particles can be cells, such as stem cells or rare cells or blood cells (such as white blood cells and/or red blood cells). In another aspect, the cells can be present in a biological fluid (e.g., blood, urine, lymph, cerebrospinal fluid, and the like). The method thus encompasses methods of separating cells (for example, of different types) based on size. For example, the cells are present in a blood sample, wherein the larger cells are circulating tumor cells (CTCs), and the smaller cells are hematologic cells. In some aspects, the CTCs are cancer cells (e.g., metastatic cancer cells) from a (one or more) breast cancer, colorectal cancer, kidney cancer, lung cancer, gastric cancer, prostate cancer, ovarian cancer, squamous cell cancer, hepatocellular cancer, nasopharyngeal cancer and other types of cancer cells. Because this approach does not require initial cell surface biomarker selection, it is suitable for use in different cancers of both epithelial and non-epithelial origin.

In another example, white blood cells (WBCs) can be separated from red blood cells. For example, WBCs and RBCs from a blood sample can be separated using the methods described herein.

The methods described herein can further comprise collecting and isolating the separated particles, including cells, nucleic acids and proteins. In certain aspects, the method can further comprise downstream analysis such as immunostaining, qRT-PCR, FISH and sequencing. In a particular aspect, the method can further comprise conducting a heterogeneity study.

As will also be appreciated by those of skill in the art, the microfluidic device can further comprise other components upstream, downstream, or within a device. For example, one or more microfluidic devices can further comprise one or more collection devices (e.g., a reservoir), flow devices (e.g., a syringe, pump, pressure gauge, temperature gauge), analysis devices (e.g., a 96-well microtiter plate, a microscope), filtration devices (e.g., a membrane), e.g., for upstream or downstream analysis (e.g., immunostaining, polymerase chain reaction (PCR) such as reverse PCR, quantitative PCR), fluorescence (e.g., fluorescence in situ hybridization (FISH)), sequencing, and the like. An imaging system may be connected to the device, to capture images from the device, and/or may receive light from the device, in order to permit real time visualization of the isolation process and/or to permit real time enumeration of isolated cells. In one example, the imaging system may view and/or digitize the image obtained through a microscope when the device is mounted on a microscope slide. For instance, the imaging system may include a digitizer and/or camera coupled to the microscope and to a viewing monitor and computer processor. In certain aspects, the device comprises a pump such as a syringe pump, a pressure pump, a peristaltic pump, or a combination of any of thereof. In certain aspects, the device is portable.

Spiral microchannels can be made from glass, silicone, and/or plastic. Microfluidic channels can be cast from a polymethylmethacrylate (PMMA) mold made by a precision milling process (Whits Technologies, Singapore). The patterns can be cast with Sylgard 184 Silicone Elastomer (PDMS) prepolymer mixed in a 10:1 ratio with the curing agent and cured under 80 C for 2 hours. After curing, the PDMS mold with patterns can be peeled and plasma bonded to another 3 mm thick PDMS layer. Input and output ports can be punched prior to bonding. For the observation of particle position from the side, the device can be cut along the output section of the channel with about 2 mm distance and then a second cast can be made by keeping the device vertical to a flat bottle container. Tubings can be connected to the ports before the second cast to prevent PDMS mixer flow into the channel. In certain additional aspects, the spiral microchannel is made from plastic. A plastic device can, for example, be made by an injection molding method for its mass-production and/or disposable usage.

The invention is illustrated by the following examples which are not meant to be limiting in any way.

EXEMPLIFICATION

Example 1: The MDDS Device

Device Fabrication

Inertial spiral microfluidic devices were fabricated in poly-dimethylsiloxane (PDMS) using standard micro-fabrication soft-lithographic techniques described previously. The master mold with specific channel dimensions was designed using SolidWorks® software and then fabricated by micro-milling machine (Whits Technologies, Singapore) on aluminum for PDMS casting. The PDMS replica was fabricated by molding degassed PDMS (mixed in a 10:1 ratio of base and curing agent, Sylgard 184, Dow Corning Inc.) on the mold and baking in the oven for 1 hour at 90° C. The fluidic access holes were punched inside the device using Uni-Core™ Puncher (Sigma-Aldrich Co. LLC. SG) and the device was irreversibly bonded to a thick layer of plain PDMS using a plasma machine (Harrick Plasma, USA). The assembled device was finally placed inside an oven at 70° C. for 30 minutes to further enhancement of bonding strength. To efficiently and evenly deliver fluid from the sample tube to four spiral channels, 3D-printed (ProtoLab, USA) guide layer with internal fluidic channel was made, which can be inserted into PDMS device. For injection of sample fluid, a peristaltic pump (Cole-Parmer, USA) or a syringe pump (Harvard Apparatus, USA) was connected to microfluidics and the sample tube through silicone tubings (Cole-Parmer, USA).

A device can also be a plastic device fabricated by injection molding. Such a method of fabrication may offer an advantage over a PDMS device in that fabrication may be simpler and more reproducible. For example, the master mold can be designed using the same process as the PDMS device and then the plastic devices can be fabricated through injection molding. The fluidic access holes are already fabricated in the plastic device and the plastic device can be bonded to a film, such as the 3M™ 9795R Advanced Polyolefin Diagnostic Microfluidic Medical Tape, by pushing to seal the channels of plastic device.

Channel Configuration and Operation Schematics

FIG. 1 shows the channel configuration of a developed multi-dimensional double spiral (MDDS) device and its operation schematics. As shown in FIG. 1, the MDDS device is composed of two spiral channels having two different dimensions. Samples containing various sizes of particles are injected into the device. In the first spiral channel, because the channel has relatively smaller dimension, particles can have larger confinement ratio ($CR=a/D_h$, where a is the particle diameter and $D_h$ is the hydraulic diameter of microchannel) so that all particles become concentrated quite close to the inner wall side with having almost same equilibrium locations. While passing through the S-shaped transition region, the concentrated particles near the inner wall side of the first spiral channel enter the outer wall side of the second spiral channel. As a result, a sample enters the second spiral channel in a concentrated band near the outer wall side, as if focusing the sample by the use of additional sheath flow. In the second spiral channel which has relatively larger dimension, the particle's CR value decreases due to the increased channel size, resulting in the equilibrium location's shift toward the outer wall side. As a result, particles form a concentrated band at different equilibrium locations depending on their sizes, which is same mechanism with the two-inlets spiral device with an additional sheath flow.[4A,8A,11A,12A]

Particle Separation in the MDDS Device

Figure 2A:
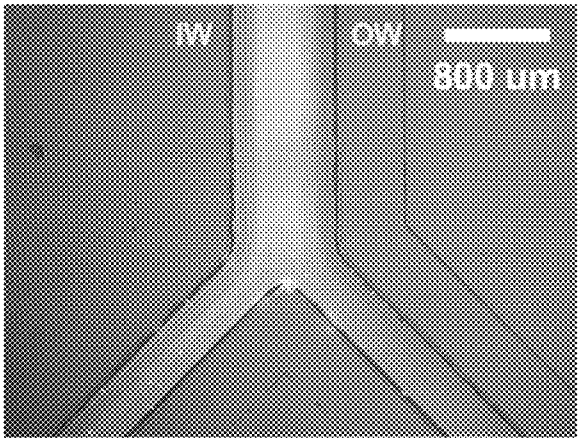
FIGS. 2A and 2B are images showing size-based separation of 6 μm and 10 μm particles at the outlet region of a single spiral device (FIG. 2A) and the transition region and outlet region of the MDDS device.
Figure 2B:
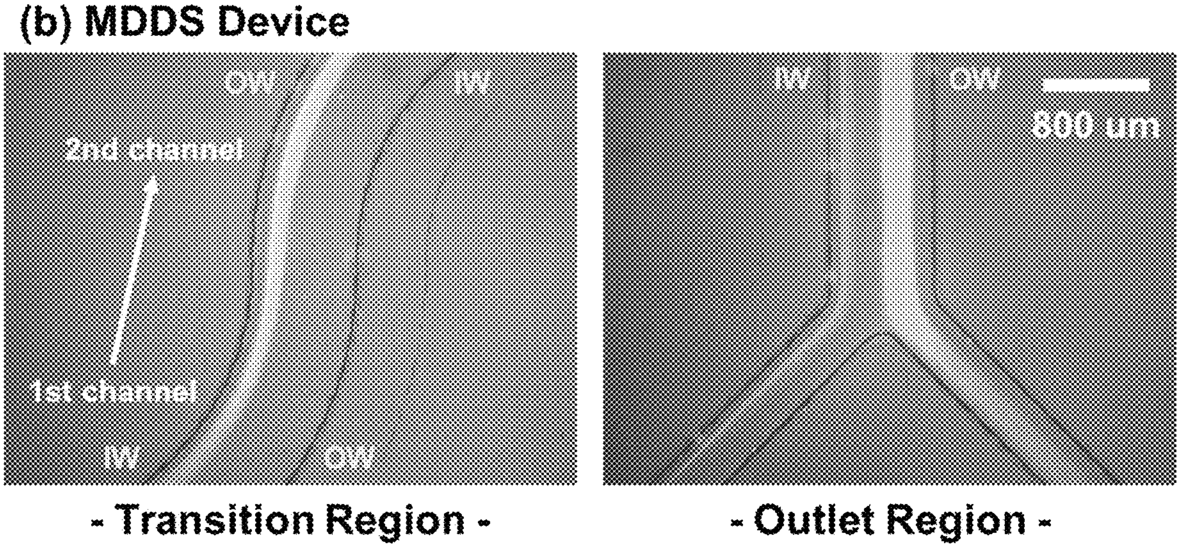

FIG. 2 shows size-based particle separation based on the MDDS device (FIG. 2B) having two-outlets configuration, compared to the single spiral channel (FIG. 2A) which has the same dimensions with the second spiral channel of the MDDS device. The first spiral channel has a rectangular cross-section with a width of 800 μm width and a height of 60 μm. In contrast to the first spiral channel, the second spiral channel is designed with larger dimensions and has a trapezoidal cross-section for the effective particle separation: the width is 800 μm, and heights are 80 and 120 μm for the inner wall side and the outer wall side, respectively. As we expected, under the optimized flow rate condition (2.3 mL/min), both 6 and 10 μm particles were highly concentrated on the inner wall side during passing through the first spiral channel with the smaller dimension due to their high CR conditions (6 μm particle: ~0.1, 10 μm particle: ~0.17) (FIG. 2B). The concentrated bands enter the outer wall side of the second spiral channel (having larger dimension than the first spiral channel) and the particles become separated with two different equilibrium locations as shown in FIG.

2B; the changed CR values for 6 and 10 μm particles are ~0.06 and ~0.1, respectively. Due to the initial focusing from the first spiral channel, particles can be separated with higher separation resolution and separation efficiency, compared to the single spiral channel, just like using an additional sheath flow.[4A,8A,11A,12A] Furthermore, due to the sequential pinch effect of the double spiral channel,[5A-7A,17A] the focusing band becomes narrower and sharper as shown for the stream of 10 μm particles as compared to the single spiral channel.

Example 2: Design Principle of Multi-Dimensional Double Spiral (MDDS) Device

Figures 3A, 3B:
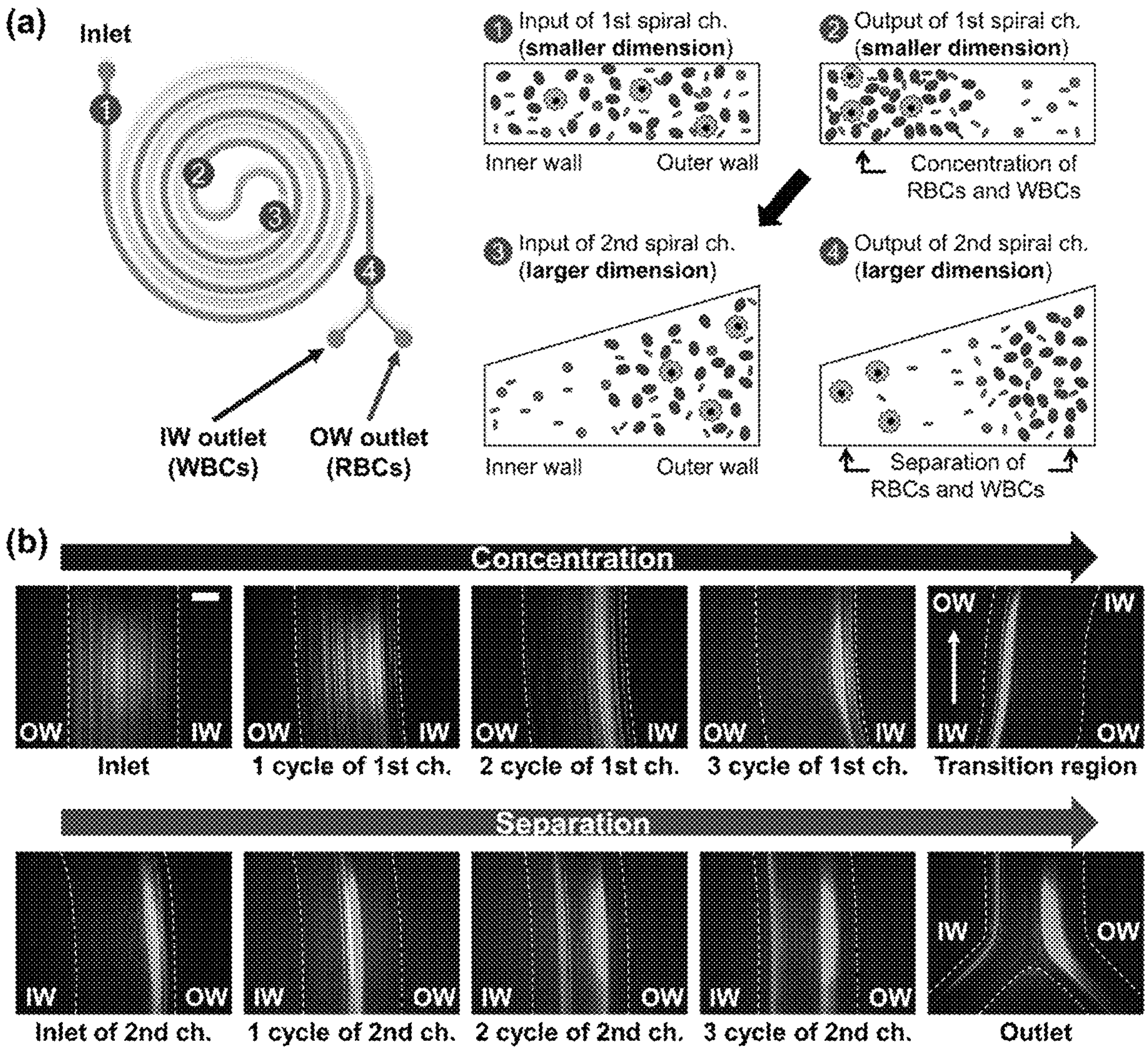
FIGS. 3A and 3B provide an overview of the multi-dimensional double spiral (MDDS) device used to separate white blood cells (WBCs) and red blood cells (RBCs).
Figures 9A, 9B:
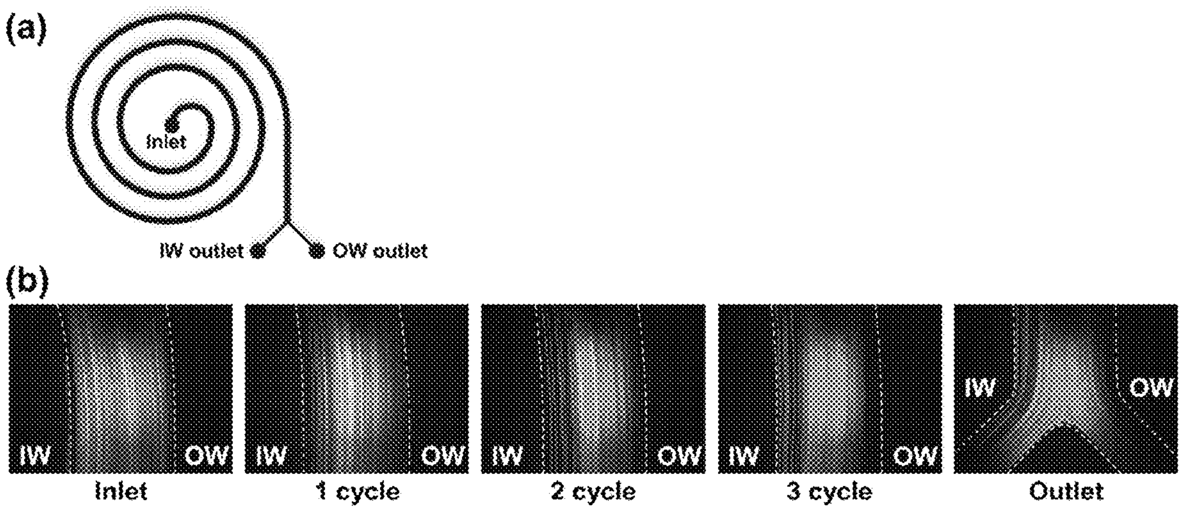
FIGS. 9A and 9B shows the channel configuration of the single spiral device.

The multi-dimensional double spiral (MDDS) device proposed here was designed as a new type of the spiral device to overcome the limitation of the spiral device with an additional sheath flow; the initial focusing of target particles can be made in the MDDS device without an additional sheath flow. FIG. 3A shows the channel configuration of the developed multi-dimensional double spiral (MDDS) device and its operation schematics. As shown in FIG. 3A, the MDDS device is composed of sequentially connected two spiral channels having two different dimensions; the first spiral channel has rectangular cross-section with 800 μm in width and 60 μm in height, and the second spiral channel was designed having larger dimension and trapezoidal cross-section for the effective particle separation with 800 μm in width and 80 and 120 μm in height for the inner wall side and the outer wall side, respectively.[7B] FIG. 3B shows the trajectory of particles at the optimized flow rate condition (2.3 mL/min) in the MDDS device; particles having diameters of 6 (green) and 10 μm (red) were used to mimic the movement of RBCs and WBCs, respectively. In the first spiral channel, all the target particles (here, which are RBCs and WBCs) are under the large confinement ratio condition ($CR=a/D_h \geq 0.07$, where a is the particle diameter and $D_h$ is the hydraulic diameter of microchannel) so that RBCs as well as WBCs can be focused into the inner wall side (FIG. 3B); CR values of 6 and 10 μm particles are ~0.1 and ~0.17, respectively. During passing through the S-shaped transition region, the concentrated stream near the inner wall side of the first spiral channel enters to the outer wall side of the second spiral channel having relatively larger dimension. In the second spiral channel, due to the increased channel dimension, RBCs no longer meet the large CR condition so that only WBCs can be focused into the inner wall side of the second spiral channel while RBCs move with being extracted into the outer wall side (FIG. 3B); CR values of 6 and 10 μm particles are ~0.06 and ~0.1, respectively, and spiral channel with trapezoidal cross-section was used as the second spiral channel for better extraction of smaller particles, RBCs.[7B] In the MDDS device, because sample fluid can be infused into the second spiral channel with a concentrated band formed near the outer wall side, as if focusing the sample by using the additional sheath flow, particle dispersion can be significantly decreased, and smaller particles can be effectively extracted into the outer-wall side of the second channel, resulting in increase of separation resolution compared to the single spiral device (FIG. 3B vs FIG. 9B); the single spiral device has the same dimension with the second spiral channel of the MDDS device.

Figures 10A, 10B:
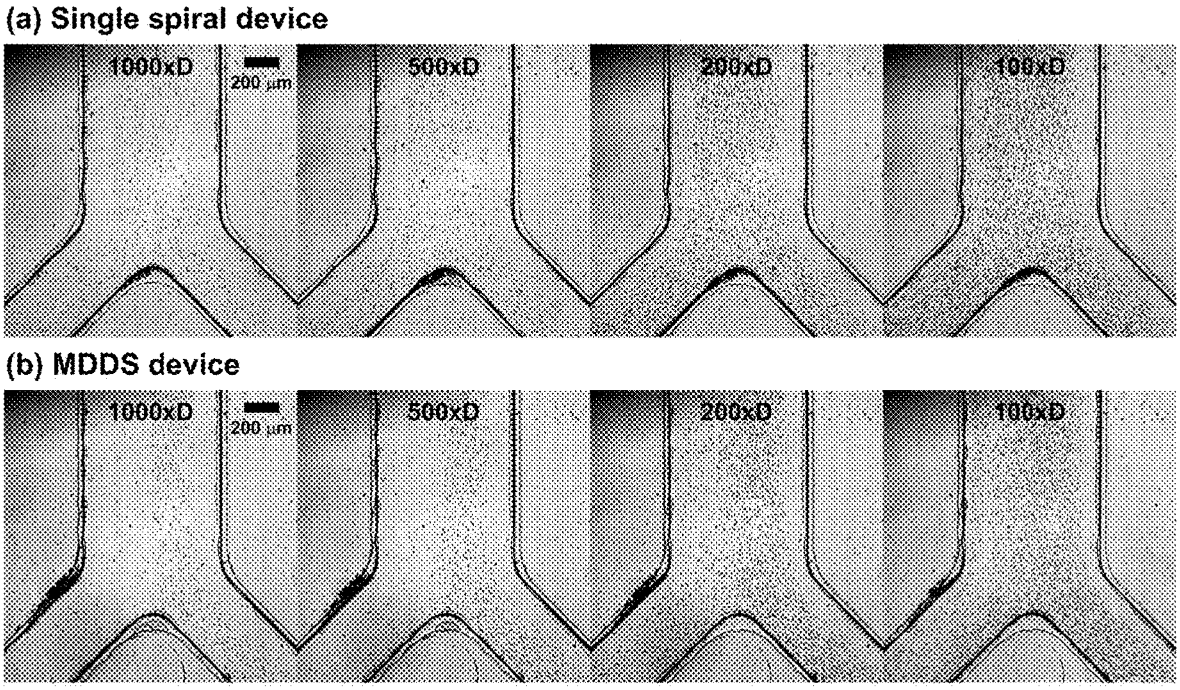
FIGS. 10A and 10B show microscopic images of blood samples in the single spiral (FIG. 10A) and the MDDS (FIG. 10B) devices under various blood dilution conditions.
Figures 11A, 11B, 11C, 11D, 11E:
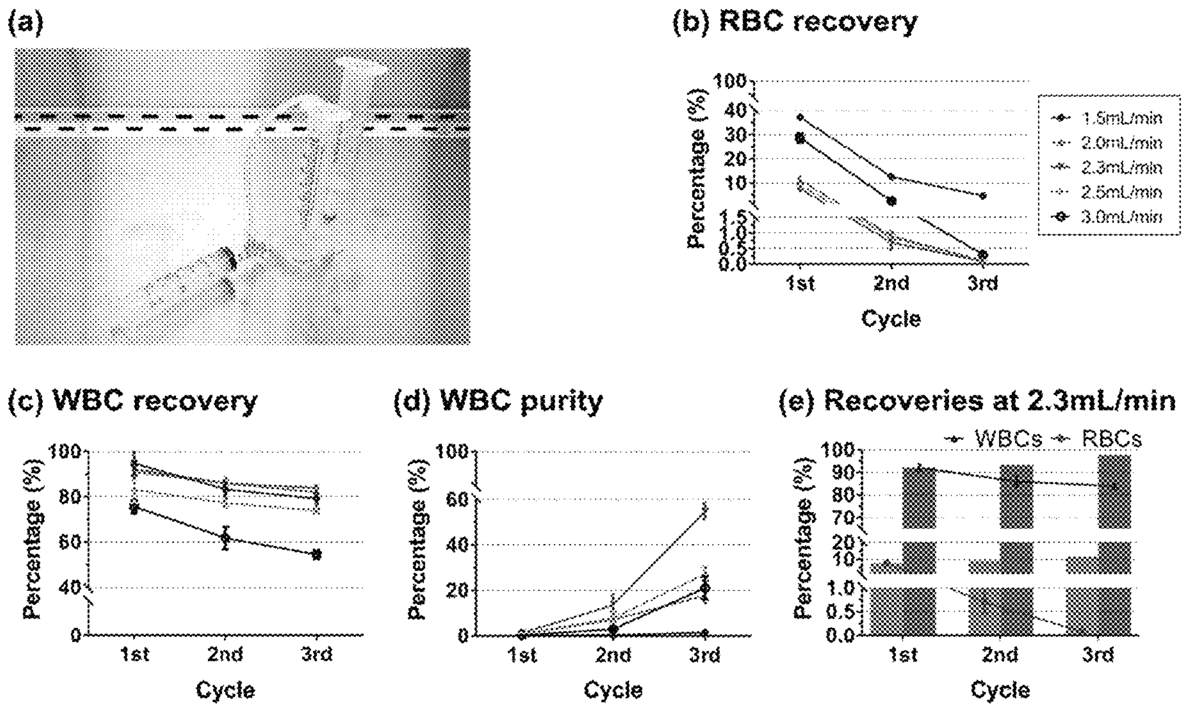
FIGS. 11A-11E shows a photo of the recirculation platform having a single-version of MDDS device.

FIG. 4 shows the results of blood separation in the MDDS device compared with the single spiral device. As we expected from the separation of 6 and 10 μm particles, although the performance varied depending on the blood dilution condition, we found that RBCs can be quite more effectively extracted into the outer wall side of the channel in the MDDS device compared to the single spiral device (FIG. 4A vs. FIG. 4B), resulting in low recovery of RBCs in the inner wall side outlet (<8% and <3% for 500× and 1000× dilution conditions, respectively, as shown in FIG. 4C), while both devices similarly showed great performance in the recovery of WBCs (>95% in the MDDS device for all the dilution conditions, as shown in FIG. 4D); as the dilution rate decreases, the distribution of RBCs across channel width is broadened due to the increase of solid fraction of (mainly contributed by RBC population), which leads to decrease in RBC removal (FIG. 10).[7B]

Example 3: Check Valve Based Recirculation Platform

Figures 5A, 5B, 5C, 5D, 5E, 5F:
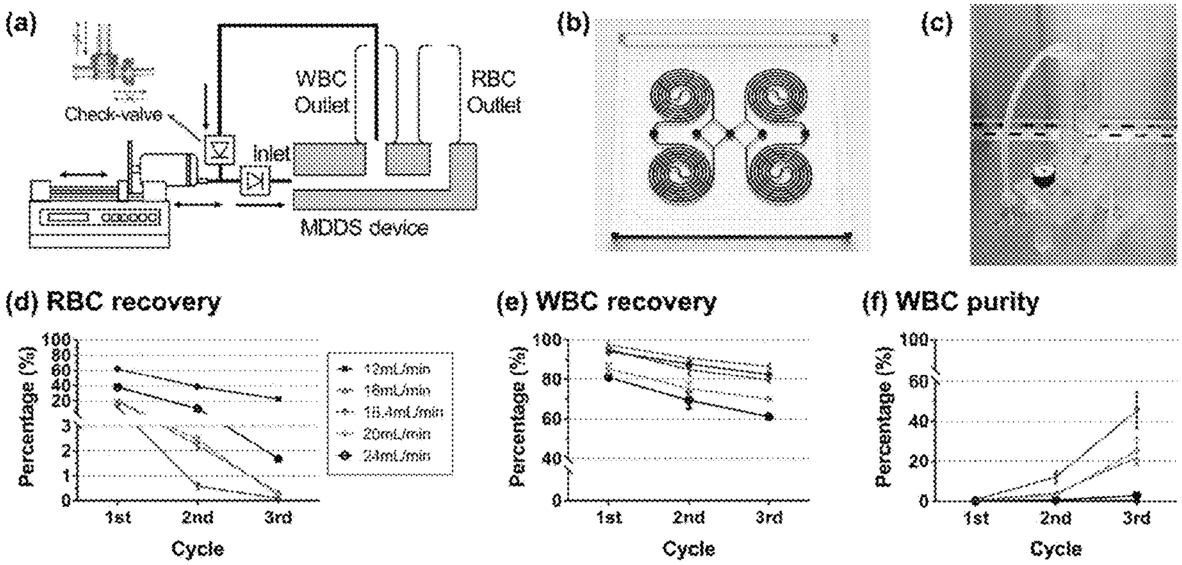
FIGS. 5A-5F is a schematic diagram of the check-valve-based recirculation platform.

To obtain more purified and concentrated WBCs, we developed a recirculation platform using a check-valve where only one direction of flow is allowed while the opposite direction of flow is blocked by the internal membrane. The dual-check-valve we used in the platform involves two different check-valves so that once separated WBCs output can be extracted back into the input syringe at the withdrawal motion of a syringe pump and processed again through the MDDS device at the infusion motion of a syringe pump, resulting in higher purity and concentration (FIG. 5). In our experiments, 500× diluted blood sample (50 μL of human peripheral blood in 25 mL PBS) was determined as the initial input sample considering the hematocrit-dependent separation performance (FIG. 4C), the required sample volume (50 μL of blood which can be drawn via finger stick), and operation time. A connector was fabricated by 3D printing to directly connect the MDDS device, syringe(s) (e.g., syringes that can be used for input and output reservoirs), and the check-valves for easier device assembly, higher portability, and minimized dead volume FIGS. 11A and 12A). Through the programmed back-and-forth motions of syringe pumps (three cycles of recirculation), about 3 mL volume of highly purified and concentrated WBCs sample can be obtained within 30 minutes in a fully-automated manner (>99.9% of RBC removal, >80% of WBC recovery, >50% of WBC purity at the optimized flow rate condition, 2.3 mL/min); for each cycle, we obtained an output having half volume of input sample where about 90% of RBCs was removed while about 90% of WBCs is recovered (FIGS. 11B to 11E). To increase throughput and reduce operation time, we developed the quad-version of MDDS device (FIG. 5B) with a new 3D printed connector which can directly connect two quad-version of MDDS devices (involving 8 MDDS devices) and syringes (for input and output reservoirs) (FIG. 5C, FIG. 12B); a small pressure meter mounted connector was designed for the hand-held operation of the platform (see the section 0), but the simplified version of the connector without the pressure meter was used for the general syringe-pump operation. From the three cycles of recirculation using the platform of two quad-version of MDDS devices, we can obtain about 3 mL volume of highly purified and concentrated WBCs sample within only 5 minutes in a fully-automated manner (>99.9% of RBC removal, ~80% of WBC recovery, >40% of WBC purity at the optimized flow rate condition, 2.3*8=18.4 mL/min) (FIGS. 5D-5F).

Figures 6A, 6B:
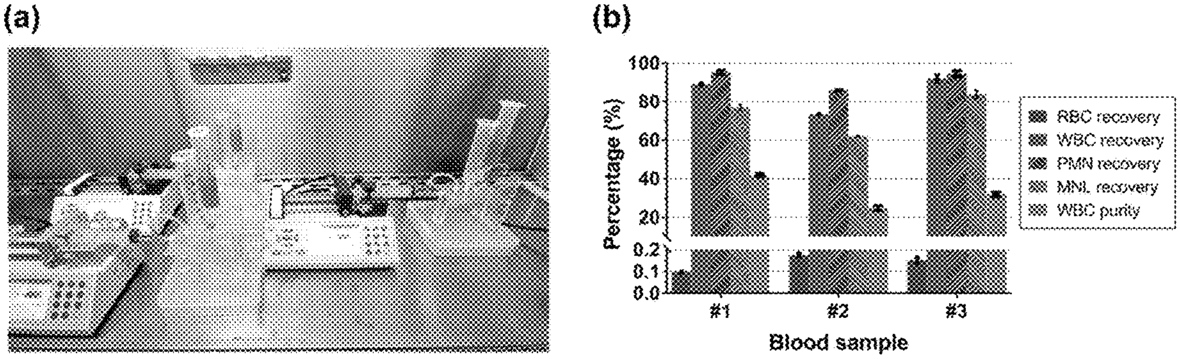
FIGS. 6A and 6B show a reliability test of the check-valve-based recirculation platform.

To validate its reliability, we also tested its parallel operation using three different platforms and three different blood samples (FIG. 6A). The results showed that the device-dependent variation was quite small for all the blood samples and all the blood cell types as the recoveries and purity of WBCs have coefficient of variation (CV) less than 5%; error bars of FIG. 6B represent standard deviation of the three different platforms). In the case of the sample-dependency, we found that the overall separation performance was good enough for all the blood samples (~99.9% of RBC removal, 70-90% of WBC recovery, 20-50% of WBC purity), but the recovery and purity rates of blood cells significantly changed depending on which blood sample was used. Cell type frequencies and their size distributions vary from donor to donor, which in turn leads to the different solid fraction and focusing behaviors of cells, resulting in the variation of the separation performance. Also, we found that for all the blood samples, the PMN recovery was better than the MNL recovery because generally size of PMN population (10-12 μm) is bigger than MNL one (7-10 μm), which corresponds with the result from the previous research using the spiral device.[7B,40B]

Figures 7A, 7B, 7C:
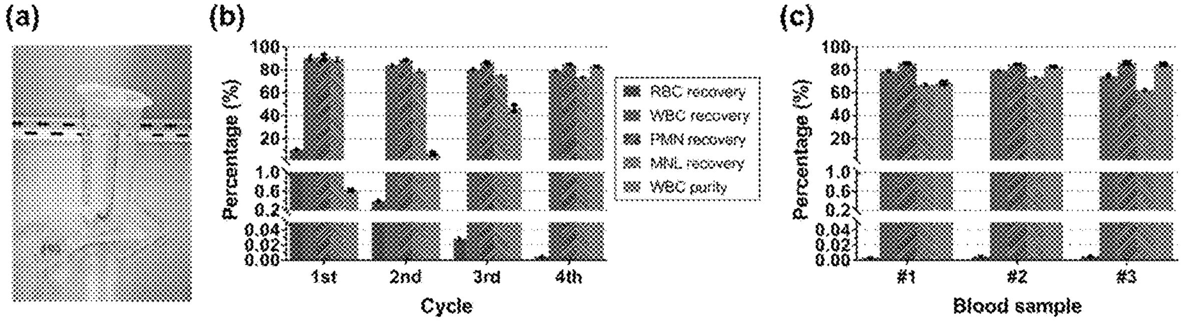
FIGS. 7A-7C shows a photo of the recirculation platform involving one quad-version of MDDS device.
Figures 12A, 12B, 12C:
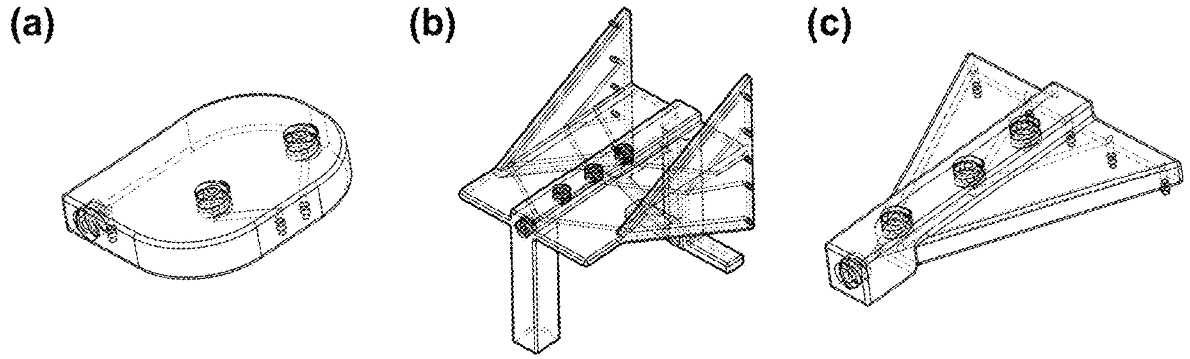
FIGS. 12A-12C shows CAD images of the 3D-printed connectors fabricated for three different recirculation platforms having a single-version of MDDS device (FIG. 12A), two quad-version of MDDS device (FIG. 12B), and one quad-version of MDDS devices (FIG. 12C).

Although WBCs can be efficiently separated and concentrated from the three-cycles of recirculation scheme using two-quad-version devices with very short operation time (within 5 minutes), the WBC purity could be still not enough for some WBC analyses; because the initial population of RBCs are about 1000 times more than WBCs, even the output with ~99.9% RBCs removed contains a similar number of RBCs with WBCs. For certain applications requiring higher WBC purity and concentration rather than fast operation, we designed another version of recirculation platform using one quad-version of MDDS device (FIG. 7A, FIG. 12C). The platform requires more operation time compared to the platform using two quad-version of MDDS devices, but the reduced dead volume makes it capable to process one more recirculation cycle; the four cycles of recirculation can be processed within 10 minutes. As shown in FIG. 7B, for each step, over 90% of RBCs was removed while over 90% of WBCs was recovered, which is slightly better performance compared to the platform using two quad-version of MDDS devices due to the reduced dead volume, and about 1.5 mL volume of highly purified and concentrated WBC sample was obtained from four cycles of recirculation (>99.99% of RBC removal, ~80% of WBC recovery, >85% of WBC purity). Similar to the platform using two quad-version of MDDS devices, we found the separation performance varied depending on which blood sample was used, and the overall separation performance became much better for all the blood samples (>99.99% of RBC removal, 70-80% of WBC recovery, 65-90% of WBC purity) (FIG. 7C).

Example 4: Hand-Powered Operation

Figures 8A, 8B, 8C, 8D, 8E, 8F:
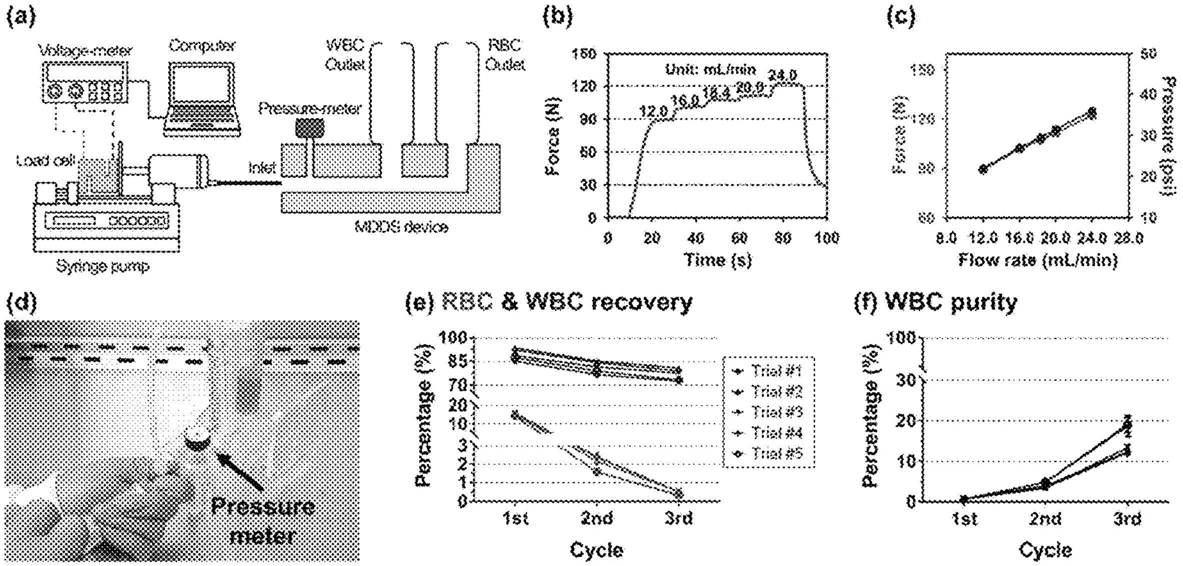
FIGS. 8A-8F shows hand-powered operation of the check-valve-based recirculation platform.

Human power could be considered as an ideal power source for driving the sample flow to operate the device in resource-poor environments. Because the MDDS device can be operated only by a sample flow without an additional sheath flow, and the recirculation method requires a simple back-and-forth motion of the input syringe, the developed platform can be operated by hand-powered syringe pushing and pulling. To find how much force is required for operating the device, we measured the applied force to the input syringe of the platform having two quad-version of MDDS devices by using a load cell which was placed between the syringe and the pusher block of the syringe pump; the output voltage from the load cell varies depending on the applied force, which is measured by a voltage-meter and transferred to an actual force value in real-time (FIGS. 8A and 8B). From the results, the required force for the optimum flow rate (18.4 mL/min) was measured about 107 N, which is reasonable force for hand-powered operation considering the average maximum pushing forces of male and female are over 300 and 200 N, respectively.[41B] To apply proper force to the syringe on the hand-powered operation, a small pressure-meter was mounted on the 3D-printed connector; the pressure-meter is directly connected with the inlet channel of the 3D-printed connector and shows the pressure value at the inlet region. First, the pressure value was measured on the syringe pump operation under various flow-rate conditions. From the results, as we expected, we found that the load and pressure increased with a similar profile as the applied flow rate increased, and the pressure value corresponding to the optimum flow rate condition (18.4 mL/min) was about 29.5 psi (FIG. 8C). Based on the pressure measurement from the syringe pump operation, the developed platform can be operated by simple hand-pushing and pulling motions; in the infusion step, the input syringe should be pushed while keeping pressure at the optimum pressure value (29.5 psi) for optimum flow rate condition (FIG. 8D). FIGS. 8E and 8F show the separation performance on the hand-powered operation with five different trials of three cycles of recirculation using the platform having two quad-version of MDDS devices. From the results, similar to the syringe-pump-based operation, we can obtain about 3 mL volume of highly purified and concentrated WBCs sample within only 5 minutes (~99.5% of RBC removal, ~75% of WBC recovery, 10-20% of WBC purity at the optimized flow rate condition, 2.3*8=18.4 mL/min) (FIGS. 8E and 8F). Although the overall separation performance became degraded a little compared to the syringe-pump-based operation due to the inevitable flow fluctuation on the hand-powered operation, the hand-operable platform could be a very useful tool for blood preparation in resource-poor environments considering its simple and fast operating process with high reliability (less than 5% of CV on the WBC recovery from the 5 different trials); for certain applications requiring higher WBC purity and concentration, the platform having one quad version of MDDS device could be used under hand-powered operation as well even though it requires more operation time.

Methods Used in Examples 2 to 4

Device Fabrication

The multi-dimensional double spiral (MDDS) device was fabricated in polydimethysiloxane (PDMS) following standard soft-lithographic techniques.[12B,36B] The aluminum master mold with specific channel dimensions was designed using a 3D CAD software (SolidWorks 2019) and then fabricated by a micromilling company (Whits Technologies, Singapore) for PDMS casting. The PDMS replica was made by casting degassed PDMS (10:1 mixture of base and curing agent of Sylgard 184, Dow Corning Inc.) onto the aluminum mold, followed by curing on the hot plate for 10 min at 150°. After making holes for fluidic access by disposable biopsy punches (Integra Miltex), the PDMS replica was irreversibly bonded to a glass slide using a plasma machine (Femto Science, Korea). The assembled device was placed in a 60° oven for at least 1 h to stabilize the bonding further.

Design of Recirculation System

Check-valve-based recirculation platform was designed to obtain more purified and concentrated WBCs. A connector of the platform was designed a 3D CAD software (SolidWorks 2019) and then fabricated by a 3D printer (Form 2, formlabs, USA) with a specific resin (RS-F2-GPCL-04, formlabs, USA). Three different connectors were made for three different recirculation platforms having a single-version of MDDS device (FIGS. 11A and 12A), two quad-version of MDDS device (FIG. 5C and FIG. 12B), and one quad-version of MDDS devices (FIG. 7A and FIG.

12C), respectively. Two kinds of check-valves were used; one is a dual-check-valve (80183, QOSINA, USA) for regulating the flow direction on injection and extraction of sample, and the other is a check-valve (80184, QOSINA, USA) for preventing the output in the RBC reservoir from flowing to the WBC reservoir. Using the 3D-printed connectors, we can directly connect the MDDS device, syringes (for input and output reservoirs), and the check-valves through simple and easy assembly process, resulting in the recirculation platforms having high portability and minimized dead volume. To prevent cross-contamination caused by the trapped cells on the internal membrane inside the check-valves, we used a new check-valve for each experiment; the check-valves we used are very cheap (about $1) to be used in the disposable manner.

Sample Preparation

For bead experiments, fluorescent polystyrene particles with diameter of 6.0 μm (18141-2, Polysciences, Inc., USA) and 10.0 μm (F8834, Invitrogen™, USA) were used after dilution in deionized water. For blood separation tests, we used fresh human whole blood samples purchased from Research Blood Components, LLC (Boston, MA, U.S.A.) with dilution in 1× phosphate-buffered saline without calcium and magnesium (PBS, Corning®). For the operation of the recirculation platform, considering the hematocrit-dependent separation performance (FIG. 4C), the required sample volume (50 μL of blood which can be drawn via finger stick), and operation time, 500× dilution condition (50 μL of human peripheral blood in 25 mL 1×PBS) was chosen.

Device Characterization

Samples were loaded to the device with the regulated flow rate by a syringe pump (Fusion 200, Chemyx Inc., USA). An inverted fluorescent microscope (IX51, Olympus Inc., USA) and a CCD camera (Sensicam QE, PCO, Germany) were used to observe the trajectories of the fluorescent particles and collect images from the device. Due to the absence of fluorescence, the trajectories of blood cells were observed by using a high-speed camera (Phantom v9.1, Vision Research Inc., USA) with a certain sample rate, 100 pictures per second (pps).

Flow Cytometry Analysis

To determine the separation efficiency, input and output samples were collected and analyzed by a flow cytometer (Accuri C6, BD Biosciences, USA) with staining the samples with the following antibodies: fluorescein isothiocyanate (FITC)-conjugated CD45 monoclonal antibody (positive for all leukocytes) and Allophycocyanin (APC)-conjugated CD66b monoclonal antibody (positive for polymorphonuclear leukocytes, PMNs); all the antibodies were purchased from eBioscience™. Considering that mononuclear leukocytes (MNLs) are composed of various cell types, and there is no efficient surface marker available to determine the total amount of MNLs, the number of MNLs was calculated as CD45-positive but CD66b-negative cells.

REFERENCE LIST A

1. Di Carlo, D. Inertial microfluidics. Lab Chip 9, 3038 (2009).
2. Martel, J. M. & Toner, M. Inertial Focusing in Microfluidics. Annu. Rev. Biomed. Eng. 16, 371-396 (2014).
3. Ryu, H. et al. Patient-Derived Airway Secretion Dissociation Technique to Isolate and Concentrate Immune Cells Using Closed-Loop Inertial Microfluidics. Anal. Chem. 89, 5549-5556 (2017).
4. Sarkar, A., Hou, H. W., Mahan, A. E., Han, J. & Alter, G. Multiplexed Affinity-Based Separation of Proteins and Cells Using Inertial Microfluidics. Sci. Rep. 6, 1-9 (2016).
5. Sun, J. et al. Double spiral microchannel for label-free tumor cell separation and enrichment. Lab Chip 12, 3952 (2012).
6. Sun, J. et al. Size-based hydrodynamic rare tumor cell separation in curved microfluidic channels. Biomicrofluidics 7, (2013).
7. Wang, J. et al. Label-Free Isolation and mRNA Detection of Circulating Tumor Cells from Patients with Metastatic Lung Cancer for Disease Diagnosis and Monitoring Therapeutic Efficacy. Anal. Chem. 87, 11893-11900 (2015).
8. Warkiani, M. E. et al. An ultra-high-throughput spiral microfluidic biochip for the enrichment of circulating tumor cells. Analyst 139, 3245-3255 (2014).
9. Warkiani, M. E., Tay, A. K. P., Guan, G. & Han, J. Membrane-less microfiltration using inertial microfluidics. Sci. Rep. 5, 11018 (2015).
10. Guan, G. et al. Spiral microchannel with rectangular and trapezoidal cross-sections for size based particle separation. Sci. Rep. 3, 1-9 (2013).
11. Hou, H. W., Bhattacharyya, R. P., Hung, D. T. & Han, J. Direct detection and drug-resistance profiling of bacteremias using inertial microfluidics. Lab Chip 15, 2297-2307 (2015).
12. Hou, H. W. et al. Isolation and retrieval of circulating tumor cells using centrifugal forces. Sci. Rep. 3, 1-8 (2013).
13. Huang, D. et al. Rapid separation of human breast cancer cells from blood using a simple spiral channel device. Anal. Methods 8, 5940-5948 (2016).
14. Kuntaegowdanahalli, S. S., Bhagat, A. A. S., Kumar, G. & Papautsky, I. Inertial microfluidics for continuous particle separation in spiral microchannels. Lab Chip 9, 2973 (2009).
15. Kwon, T. et al. Microfluidic Cell Retention Device for Perfusion of Mammalian Suspension Culture. Sci. Rep. 7, 1-11 (2017).
16. Russom, A. et al. Differential inertial focusing of particles in curved low-aspect-ratio microchannels. New J. Phys. 11, (2009).
17. Seo, J., Lean, M. H. & Kole, A. Membrane-free microfiltration by asymmetric inertial migration. Appl. Phys. Lett. 91, (2007).
18. Sudarsan, A. P. & Ugaz, V. M. Multivortex micromixing. Proc. Natl. Acad. Sci. 103, 7228-7233 (2006).
19. Howell, P. B., Mott, D. R., Golden, J. P. & Ligler, F. S. Design and evaluation of a Dean vortex-based micromixer. Lab Chip 4, 663-669 (2004).
20. Sudarsan, A. P. & Ugaz, V. M. Fluid mixing in planar spiral microchannels. Lab Chip 6, 74-82 (2006).
21. Rafeie, M., Zhang, J., Asadnia, M., Li, W. & Warkiani, M. E. Multiplexing slanted spiral microchannels for ultra-fast blood plasma separation. Lab Chip 16, 2791-2802 (2016).
22. Wu, L., Guan, G., Hou, H. W., Bhagat, A. A. S. & Han, J. Separation of leukocytes from blood using spiral channel with trapezoid cross-section. Anal. Chem. 84, 9324-9331 (2012).
23. Xiang, N. et al. Inertial microfluidic syringe cell concentrator. Anal. Chem. acs.analchem.8b02201 (2018). doi:10.1021/acs.analchem.8b02201
24. Xiang, N. et al. Improved understanding of particle migration modes in spiral inertial microfluidic devices. RSC Adv. 5, 77264-77273 (2015).

25. Zhou, J., Giridhar, P. V., Kasper, S. & Papautsky, I. Modulation of aspect ratio for complete separation in an inertial microfluidic channel. Lab Chip 13, 1919 (2013).
26. Bhagat, A. A. S., Kuntaegowdanahalli, S. S. & Papautsky, I. Continuous particle separation in spiral microchannels using dean flows and differential migration. Lab Chip 8, 1906 (2008).
27. Choi, K. et al. Negative Selection by Spiral Inertial Microfluidics Improves Viral Recovery and Sequencing from Blood. Anal. Chem. 90, 4657-4662 (2018).
28. Di Carlo, D., Edd, J. F., Irimia, D., Tompkins, R. G. & Toner, M. Equilibrium separation and filtration of particles using differential inertial focusing. Anal. Chem. 80, 2204-2211 (2008).

REFERENCE LIST B

1. Zhang, J. et al. High-Throughput Separation of White Blood Cells from Whole Blood Using Inertial Microfluidics. *IEEE Trans. Biomed. Circuits Syst.* 11, 1422-1430 (2017).
2. Guo, Q., Duffy, S. P., Matthews, K., Islamzada, E. & Ma, H. Deformability based Cell Sorting using Microfluidic Ratchets Enabling Phenotypic Separation of Leukocytes Directly from Whole Blood. *Sci. Rep.* 7, 1-11 (2017).
3. Kuan, D. H., Wu, C. C., Su, W. Y. & Huang, N. T. A Microfluidic Device for Simultaneous Extraction of Plasma, Red Blood Cells, and On-Chip White Blood Cell Trapping. *Sci. Rep.* 8, 1-9 (2018).
4. Hu, X. J. et al. Precise label-free leukocyte subpopulation separation using hybrid acoustic-optical chip. *Lab Chip* 18, 3405-3412 (2018).
5. Wu, Z., Chen, Y, Wang, M. & Chung, A. J. Continuous inertial microparticle and blood cell separation in straight channels with local microstructures. *Lab Chip* 16, 532-542 (2016).
6. Urbansky, A., Olm, F., Scheding, S., Laurell, T. & Lenshof, A. Label-free separation of leukocyte subpopulations using high throughput multiplex acoustophoresis. *Lab Chip* 19, 1406-1416 (2019).
7. Wu, L., Guan, G., Hou, H. W., Bhagat, A. A. S. & Han, J. Separation of leukocytes from blood using spiral channel with trapezoid cross-section. *Anal. Chem.* 84, 9324-9331 (2012).
8. Petchakup, C., Tay, H. M., Li, K. H. H. & Hou, H. W. Integrated inertial-impedance cytometry for rapid label-free leukocyte isolation and profiling of neutrophil extracellular traps (NETs). *Lab Chip* 19, 1736-1746 (2019).
9. Jeon, H., Lee, H., Kang, K. H. & Lim, G. Ion concentration polarization-based continuous separation device using electrical repulsion in the depletion region. *Sci. Rep.* 3, 3483 (2013).
10. Jeon, H., Kim, Y. & Lim, G. Continuous particle separation using pressure-driven flow-induced miniaturizing free-flow electrophoresis (PDF-induced μ-FFE). *Sci. Rep.* 6, 19911 (2016).
11. Di Carlo, D. Inertial microfluidics. *Lab Chip* 9, 3038 (2009).
12. Ryu, H. et al. Patient-Derived Airway Secretion Dissociation Technique to Isolate and Concentrate Immune Cells Using Closed-Loop Inertial Microfluidics. *Anal. Chem.* 89, 5549-5556 (2017).
13. Sarkar, A., Hou, H. W., Mahan, A. E., Han, J. & Alter, G. Multiplexed Affinity-Based
Separation of Proteins and Cells Using Inertial Microfluidics. *Sci. Rep.* 6, 1-9 (2016).
14. Sun, J. et al. Double spiral microchannel for label-free tumor cell separation and enrichment. *Lab Chip* 12, 3952 (2012).
15. Sun, J. et al. Size-based hydrodynamic rare tumor cell separation in curved microfluidic channels. *Biomicrofluidics* 7, (2013).
16. Wang, J. et al. Label-Free Isolation and mRNA Detection of Circulating Tumor Cells from Patients with Metastatic Lung Cancer for Disease Diagnosis and Monitoring Therapeutic Efficacy. *Anal. Chem.* 87, 11893-11900 (2015).
17. Warkiani, M. E. et al. An ultra-high-throughput spiral microfluidic biochip for the enrichment of circulating tumor cells. *Analyst* 139, 3245-3255 (2014).
18. Warkiani, M. E., Tay, A. K. P., Guan, G. & Han, J. Membrane-less microfiltration using inertial microfluidics. *Sci. Rep.* 5, 11018 (2015).
19. Guan, G. et al. Spiral microchannel with rectangular and trapezoidal cross-sections for size based particle separation. *Sci. Rep.* 3, 1-9 (2013).
20. Hou, H. W., Bhattacharyya, R. P., Hung, D. T. & Han, J. Direct detection and drug-resistance profiling of bacteremias using inertial microfluidics. *Lab Chip* 15, 2297-2307 (2015).
21. Hou, H. W. et al. Isolation and retrieval of circulating tumor cells using centrifugal forces. *Sci. Rep.* 3, 1-8 (2013).
22. Martel, J. M. & Toner, M. Inertial Focusing in Microfluidics. Annu. Rev. Biomed. Eng. 16, 371-396 (2014).
23. Kuntaegowdanahalli, S. S., Bhagat, A. A. S., Kumar, G. & Papautsky, I. Inertial microfluidics for continuous particle separation in spiral microchannels. *Lab Chip* 9,2973 (2009).
24. Kwon, T. et al. Microfluidic Cell Retention Device for Perfusion of Mammalian Suspension Culture. *Sci. Rep.* 7, 1-11 (2017).
25. Russom, A. et al. Differential inertial focusing of particles in curved low-aspect-ratio microchannels. *New J. Phys.* 11, (2009).
26. Seo, J., Lean, M. H. & Kole, A. Membrane-free microfiltration by asymmetric inertial migration. *Appl. Phys. Lett.* 91, (2007).
27. Sudarsan, A. P. & Ugaz, V. M. Multivortex micromixing. *Proc. Natl. Acad. Sci.* 103, 7228-7233 (2006).
28. Howell, P. B., Mott, D. R., Golden, J. P. & Ligler, F. S. Design and evaluation of a Dean vortex-based micromixer. *Lab Chip* 4, 663-669 (2004).
29. Sudarsan, A. P. & Ugaz, V. M. Fluid mixing in planar spiral microchannels. *Lab Chip* 6, 74-82 (2006).
30. Huang, D. et al. Rapid separation of human breast cancer cells from blood using a simple spiral channel device. *Anal. Methods* 8, 5940-5948 (2016).
31. Rafeie, M., Zhang, J., Asadnia, M., Li, W. & Warkiani, M. E. Multiplexing slanted spiral microchannels for ultra-fast blood plasma separation. *Lab Chip* 16, 2791-2802 (2016).
32. Xiang, N. et al. Inertial microfluidic syringe cell concentrator. *Anal. Chem.* acs.analchem.8b02201 (2018). doi:10.1021/acs.analchem.8b02201
33. Xiang, N. et al. Improved understanding of particle migration modes in spiral inertial microfluidic devices. *RSC Adv.* 5, 77264-77273 (2015).
34. Zhou, J., Giridhar, P. V, Kasper, S. & Papautsky, I. Modulation of aspect ratio for complete separation in an inertial microfluidic channel. *Lab Chip* 13, 1919 (2013).
35. Bhagat, A. A. S., Kuntaegowdanahalli, S. S. & Papautsky, I. Continuous particle separation in spiral microchannels using dean flows and differential migration. *Lab Chip* 8, 1906 (2008).
36. Choi, K. et al. Negative Selection by Spiral Inertial Microfluidics Improves Viral Recovery and Sequencing from Blood. *Anal. Chem.* 90, 4657-4662 (2018).
37. Chai, C. et al. Hand-powered ultralow-cost paper centrifuge. *Nat. Biomed. Eng.* 1, 0009 (2017).
38. Xiang, N. et al. Flow stabilizer on a syringe tip for hand-powered microfluidic sample injection. *Lab Chip* (2018). doi:10.1039/C8LC01051J
39. Di Carlo, D., Edd, J. F., Irimia, D., Tompkins, R. G. & Toner, M. Equilibrium separation and filtration of particles using differential inertial focusing. *Anal. Chem.* 80, 2204-2211 (2008).
40. Downey, G. P. et al. Retention of leukocytes in capillaries: Role of cell size and deformability. *J. Appl. Physiol.* 69, 1767-1778 (1990).
41. Department of Trade and Industry. Strength Data for Design Safety—Phase 1. Gov. Consum. *Saf Res.* 38 (2000).
42. Serhan, C. N. Pro-resolving lipid mediators are leads for resolution physiology. *Nature* 510, 92-101 (2014).
43. Barnig, C. et al. Lipoxin A4 regulates natural killer cell and type 2 innate lymphoid cell activation in asthma. *Sci. Transl. Med.* 5, (2013).

While this invention has been particularly shown and described with references to preferred embodiments thereof, it will be understood by those skilled in the art that various changes in form and details may be made therein without departing from the scope of the invention encompassed by the appended claims. It should also be understood that the preferred embodiments described herein are not mutually exclusive and that features from the various preferred embodiments may be combined in whole or in part in accordance with the invention.

The patent and scientific literature referred to herein establishes the knowledge that is available to those with skill in the art. All United States patents and published or unpublished United States patent applications cited herein are incorporated by reference. All published foreign patents and patent applications cited herein are hereby incorporated by reference. All other published references, documents, manuscripts and scientific literature cited herein are hereby incorporated by reference. The relevant teachings of all patents, published applications and references cited herein are incorporated by reference in their entirety.

What is claimed is:

1. A microfluidic device comprising a multidimensional double spiral (MDDS), wherein the MDDS comprises:

a. a first spiral microchannel comprising a first inlet;

b. a second spiral microchannel in fluid communication with the first spiral microchannel and comprising an inner wall outlet and two or more outer wall outlets, wherein the inner wall outlet is located on an inner wall side of the second spiral microchannel closer to the center of the spiral and the two or more outer wall outlets are located on an outer wall side of the second spiral microchannel farther from the center of the spiral; and c. a microchannel transition region having one end with the same diameter as the first spiral microchannel and a second end with the same diameter as the second spiral microchannel, wherein the transition region is a microchannel that connects the first and second spiral microchannels sequentially, wherein output from the first spiral microchannel is directed into the second spiral microchannel through the transition region;

wherein the first spiral microchannel has a smaller cross-sectional area than the second spiral microchannel;

wherein the cross-sectional area of the first spiral microchannel remains constant along the length of the first spiral microchannel and wherein the cross-sectional area of the second spiral microchannel remain constant along the length of the second spiral microchannel;

wherein the cross-section of the transition region increases from the first spiral microchannel to the second spiral microchannel, and wherein the particles from a sample fluid comprising a mixture of particles separate across the second spiral microchannel according to particle size to their equilibrium location, as a function of the greater cross-sectional area of the second spiral microchannel relative to the cross-sectional area of the first spiral microchannel.

2. The device of claim 1, wherein the cross-sectional area of the first spiral microchannel is effective to form the particles into a concentrated particle stream on the inner wall of the first spiral microchannel as the particles move through the first spiral microchannel and the larger cross-sectional area of the second spiral microchannel causes the particles from the concentrated particle stream to separate across the second spiral microchannel based on their sizes, with the largest particles on the inner wall of the second spiral microchannel and the smallest particles on the outer wall of the second spiral microchannel.

3. The device of claim 2, wherein the second spiral microchannel comprises two or more outer wall outlets to separately collect the particles separated by size into their equilibrium location as they exit the second spiral microchannel.

4. The device of claim 2, wherein the first spiral microchannel is in the shape of a rectangle or trapezoid and is spiraled to form the concentrated particle stream on the inner wall side of the first spiral microchannel.

5. The device of claim 4, wherein the first spiral microchannel the concentrated particle stream through the transition region to enter the outer wall side of the second spiral microchannel.

6. The device of claim 5, wherein the second spiral microchannel is shaped as a rectangle or trapezoid and directs a first particle stream to the inner wall outlet of the second spiral microchannel and a second particle stream to one or more of the two or more outer wall outlets of the second spiral microchannel, wherein the first particle stream comprises particles having a larger average diameter than that of the particles in the second particle stream.

7. The device of claim 6, wherein the second spiral microchannel further comprises a middle outlet located between the two or more outer wall outlets of the second spiral microchannel and the inner wall outlet of the second spiral microchannel, wherein cross sectional area and shape of the second spiral microchannel directs a third particle stream to the middle outlet of the second spiral microchannel, wherein the third particle stream comprises particles having an average diameter less than that of the particles in the first particle stream and greater than that of the particles in the second particle stream.

8. The device of claim 1, wherein the second spiral microchannel is nested within the first spiral microchannel.

9. The device of claim 8, wherein the first inlet of the first spiral microchannel is on the circumference of the first spiral microchannel.

10. The device of claim 8, wherein the second spiral microchannel comprises two or more outlets on the outer circumference of the spiral microchannel device.

11. The device of claim 1, wherein the device has a recirculation microchannel to recirculate sample fluid through the first spiral microchannel.

12. The device of claim 11, wherein at least one outlet of the second spiral microchannel is in fluid communication with an inlet of the first spiral microchannel.

13. The device of claim 1, wherein the second spiral microchannel has a non-rectangular cross section.

14. The device of claim 13, wherein the first microchannel has a non-rectangular or trapezoidal cross-section.

15. The device of claim 13, wherein the first spiral microchannel has a rectangular cross-section.

16. The device of claim 13, wherein the second spiral microchannel has a trapezoidal cross section defined by a radially inner side, a radially outer side, a bottom side, and a top side, the cross section having a) the radially inner side and the radially outer side unequal in height, or b) the radially inner side equal in height to the radially outer side, wherein the top side has at least two continuous straight sections, each unequal in width to the bottom side.

17. A device of claim 2, wherein the device further comprises a system for closed loop recirculation, wherein the inner wall outlet of the MDDS is in fluid communication with a first output reservoir and at least one of the two or more outer wall outlets is in fluid communication with a second output reservoir; and wherein the system for closed loop recirculation recirculates the fluid from the first output reservoir into the inlet of the first spiral microchannel, and comprises a syringe in fluid communication with the first output reservoir and the inlet of the first spiral microchannel;

a first check valve positioned between and in fluid communication with the first output reservoir and the syringe, wherein the first check valve blocks flow from the syringe to the first output reservoir when the syringe is actuated to infuse the fluid into the inlet of the first spiral channel; and a second check valve positioned between and in fluid communication with the syringe and the inlet of the first spiral channel, wherein the second check valve blocks flow from the inlet of the first spiral channel to the syringe when the syringe is actuated to withdraw the fluid from the first output reservoir into the syringe; or wherein the system for closed loop recirculation recirculates the fluid from the second output reservoir into the inlet of the first spiral channel, and comprises a syringe in fluid communication with the second output reservoir and the inlet of the first spiral channel; a first check valve positioned between and in fluid communication with the second output reservoir and the syringe, wherein the first check valve blocks flow from the syringe to the second output reservoir when the syringe is actuated to infuse the fluid into the inlet of the first spiral channel; and a second check valve positioned between and in fluid communication with the syringe and the inlet of the first spiral channel, wherein the second check valve blocks flow from the inlet of the first spiral channel to the syringe when the syringe is actuated to withdraw the fluid from the second output reservoir into the syringe.

18. The device of claim 17, wherein the system for closed loop recirculation recirculates the fluid from the first output reservoir into the inlet of the first microchannel.

19. The device of claim 17, wherein the system for closed loop recirculation recirculates the fluid from the second output reservoir into the inlet of the first microchannel.

20. The device of claim 17, wherein the syringe is part of a syringe pump.

21. The device of claim 18, further comprising an additional check valve positioned between and in fluid communication with at least one of the two or more outer wall outlets and the second output reservoir, wherein the additional check valve blocks flow from the second output reservoir to the first output reservoir.

22. The device of claim 19, further comprising an additional check valve positioned between and in fluid communication with the inner wall outlet and the first output reservoir, wherein the additional check valve blocks flow from the first output reservoir to the second output reservoir.

23. The device of claim 18, wherein the device comprises at least two multi-dimensional double spirals, wherein each inlet of the device is in fluid communication with a first output reservoir, wherein each inner wall outlet of the device is in fluid communication with a first output reservoir, and each outer wall outlet of the device is in fluid communication with a second output reservoir.

24. The device of claim 19, wherein the device comprises at least two multi-dimensional double spirals, wherein each inlet of the device is in fluid communication with a second output reservoir, wherein each inner wall outlet of the device is in fluid communication with a first output reservoir, and each outer wall outlet of the device is in fluid communication with a second output reservoir.

25. The device of claim 17, wherein the second microchannel has a rectangular or a non-rectangular cross section.

26. The device of claim 25, wherein the first microchannel has a rectangular or a non-rectangular cross-section.

27. A method of separating particles from a sample fluid comprising a mixture of particles, the method comprising the steps of:

a. introducing the sample fluid into the inlet of the first spiral microchannel of the device of claim 1, b. directing the sample fluid through the first spiral microchannel to the transition region of the device and into the second spiral microchannel, and c. directing a first particle stream to the inner wall outlet and directing a second particle stream to at least one of the two or more outer wall outlets, and optionally wherein the first particle stream comprises particles having a larger average diameter than that of the particles in the second particle stream.

28. A method of separating particles from a sample fluid comprising a mixture of particles, the method comprising the steps of:

a. introducing the sample fluid into the inlet of the first spiral microchannel of the device of claim 18, b. directing the sample fluid through the first spiral microchannel to the transition region of the device and into the second spiral microchannel, and c. directing a first particle stream to the inner wall outlet and directing a second particle stream to at least one of the two or more outer wall outlets, and optionally wherein the first particle stream comprises particles having a larger average diameter than that of the particles in the second particle stream;

wherein the inner wall outlet directs the first particle stream to the first output reservoir and at least one of the two or more outer wall outlet directs the second particle stream to the second output reservoir, wherein the fluid in the first output reservoir is recirculated by actuating the syringe to withdraw the fluid from the first output reservoir and infuse the fluid into the first inlet of the first spiral microchannel.

29. A method of separating particles from a sample fluid comprising a mixture of particles, the method comprising the steps of:

a. introducing the sample fluid into the inlet of the first spiral microchannel of the device of claim 19, b. directing the sample fluid through the first spiral microchannel to the transition region of the device and into the second spiral microchannel, and c. directing a first particle stream to the inner wall outlet and directing a second particle stream to at least one of the two or more outer wall outlets, and optionally wherein the first particle stream comprises particles having a larger average diameter than that of the particles in the second particle stream;

wherein the inner wall outlet directs the first particle stream to the first output reservoir and at least one of the two or more outer wall outlets directs the second particle stream to the second output reservoir, wherein the fluid in the second output reservoir is recirculated by actuating the syringe to withdraw the fluid from the second output reservoir and infuse the fluid into the first inlet of the first spiral microchannel.

30. A method of separating white blood cells from a blood sample, the method comprising the steps of:

a. introducing the blood sample into the inlet of the first spiral microchannel of the device of claim 18, b. directing the blood sample through the first spiral microchannel to the transition region of the device and into the second spiral microchannel, and c. directing a first particle stream to the inner wall outlet and directing a second particle stream to at least one of the two or more outer wall outlets, wherein the first particle stream comprises white blood cells and the second particle stream comprises red blood cells;

wherein the inner wall outlet directs the first particle stream to the first output reservoir and at least one of the two or more outer wall outlets directs the second particle stream to the second output reservoir, wherein the fluid in the first output reservoir is recirculated by actuating the syringe to withdraw the fluid from the first output reservoir and infuse the fluid into the first inlet of the first spiral microchannel.

* * * * *